(12) United States Patent
Graffoulière

(10) Patent No.: US 6,954,413 B2
(45) Date of Patent: Oct. 11, 2005

(54) PROCESS AND DEVICE FOR EVALUATING SYMBOL LENGTHS ON A RECORDING MEDIUM

(75) Inventor: Philippe Graffoulière, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 401 days.

(21) Appl. No.: 10/320,757

(22) Filed: Dec. 16, 2002

(65) Prior Publication Data

US 2003/0123362 A1 Jul. 3, 2003

(30) Foreign Application Priority Data

Dec. 18, 2001 (FR) .............................................. 0116380

(51) Int. Cl.$^7$ ................................................ G11B 7/00
(52) U.S. Cl. .................................................. 369/53.34
(58) Field of Search .......................... 369/53.34, 47.28, 369/59.19, 59.2, 59.12, 59.21, 59.25, 47.35, 124.05, 124.06

(56) References Cited

U.S. PATENT DOCUMENTS

| | | | |
|---|---|---|---|
| 5,337,335 A | 8/1994 | Cloetens et al. | 375/120 |
| 5,978,335 A | * 11/1999 | Clark et al. | 369/53.34 |
| 6,134,197 A | * 10/2000 | Ishibashi et al. | 369/44.32 |
| 6,392,569 B1 | 5/2002 | Mimachi et al. | 341/58 |
| 6,654,325 B1 | * 11/2003 | Minemura et al. | 369/47.28 |

FOREIGN PATENT DOCUMENTS

| | | |
|---|---|---|
| EP | 0544358 | 6/1993 |
| EP | 1022858 | 7/2000 |

* cited by examiner

Primary Examiner—Brian E. Miller
Assistant Examiner—Peter Vincent Agustin
(74) Attorney, Agent, or Firm—Lisa K. Jorgenson; Allen, Dyer, Doppelt, Milbrath & Gilchrist, P.A.

(57) ABSTRACT

A symbol length is evaluated on the basis of receiving a first-symbol length, and a phase error with respect to detection of a length of the first symbol before receiving a length of a second symbol following the first symbol. The process includes evaluating at least two random phase errors on the basis of the phase error received. A first random phase error is dependent on a deterministic phase error with respect to a first state corresponding to an absence of a corrected first-symbol length. A second random phase error is dependent on a deterministic phase error with respect to a second state corresponding to the corrected first-symbol length. The process includes retaining as an evaluated symbol length the first-symbol length received if the absolute value of the first random phase error reduces a condition of passing through the first state. The second step also retains as an evaluated symbol length the corrected first-symbol length if the absolute value of the second random phase error reduces the condition of passing through the second state.

28 Claims, 13 Drawing Sheets

PROCESS AND DEVICE FOR EVALUATING SYMBOL LENGTHS ON A RECORDING MEDIUM

FIELD OF THE INVENTION

The present invention relates to the field of electronics, and in particular, to the retrieval of coded information on a recording medium.

BACKGROUND OF THE INVENTION

Technological performance is evolving towards an increasing density of storage, and towards an increasing speed of reading recorded media. High information density and a fast reading speed are particularly concerned with the bandwidth of the transmission channel between the recording medium and the device for retrieving the stored information.

Approaches have been developed with success for communication applications and for magnetic recording media. For example, the coding of information on hard disks often uses the known partial response (PR) codes. These are multilevel codes whose signal spectrum is easily adaptable to the transmission channel for a given running speed. The retrieval device then uses a maximum likelihood (ML) decoding. The various levels of the signal transmitted in analog form are converted into a digital signal by samplings of an analog digital converter (ADC) with several bits. However, these systems which are known as PRML, implement a digital filtering which does not allow the use of a single-bit ADC converter.

To obtain a high density storage on the information medium, the information may be coded using symbols of various lengths on two possible aspects of a surface of the medium. For example, on an optical disk, a presence and an absence of a hole differently reflects a light ray causing binary modulation of a transmission signal. This makes it possible to code a symbol as a hole whose length is representative of this symbol, and to code the following symbol directly by an absence of a hole whose length is likewise representative of this following symbol. It is thus possible to code a succession of symbols on the medium by a succession of holes and an absence of holes without losing room. The symbol length is obtained directly in digital form by counting clock periods on the same aspect of the surface of the medium, then similarly on the same complementary aspect for the following symbol. It would then be beneficial to use a single-bit analog-to-digital converter.

However, the evaluation of symbol lengths is disturbed by numerous phenomena, such as the transfer function of the transmission channel, its sensitivity to noise having a random nature and inter-symbol interference. Interference between symbols, although not generally exceeding two symbols, is particularly acute for symbol lengths on the order of 0.42 $\mu$m with a reading beam diameter on the order of 0.74 $\mu$m.

The devices of the prior art particularly require careful calibration and give rise to constraints in the design of the analog circuits and in their parameterization.

SUMMARY OF THE INVENTION

In view of the foregoing background, an object of the present invention is to remedy the drawbacks of the prior art.

This and other objects, advantages and features in accordance with the present invention are provided by a process for evaluating a symbol length on the basis of receiving a first-symbol length and a phase error with regards to detection of a length of the first symbol before receiving a length of a second symbol which follows the first symbol.

The process preferably comprises first and second steps. A first step evaluates at least two random phase errors on the basis of the phase error received. A first random phase error is a function of a deterministic phase error with respect to a first state corresponding to an absence of correction of the first-symbol length. A second random phase error is a function of a deterministic phase error with respect to a second state corresponding to a correction of the first-symbol length.

The second step retains as an evaluated symbol length the first-symbol length received if the absolute value of the first random phase error minimizes a condition of passing through the first state. This step also retains as an evaluated symbol length the corrected first-symbol length if the absolute value of the second random phase error minimizes the condition of passing through the second state.

More particularly, in the first step the first deterministic phase error for a first state corresponding to an absence of correction of a first-symbol length is taken equal to a difference between a systematic phase error at the end of the first symbol, and a systematic phase error at the start of the second symbol of uncorrected lengths. The second deterministic phase error for a second state corresponding to a correction of first-symbol length is taken equal to a difference between a systematic phase error at the end of the first symbol, and a systematic phase error at the start of the second symbol of lengths corrected respectively by an increase and a decrease of a clock period.

The process is improved when in the first step eight random phase errors are evaluated for a current event, four of which are dependent on a deterministic phase error for each of four first states corresponding to an absence of correction of the first-symbol length, four of which are dependent on a deterministic phase error for each of four second states corresponding to a correction of first-symbol length. In the second step the symbol length retained for a preceding event corresponds to the state of the preceding event for which an aggregate of absolute values of random errors for each event state going from the preceding event to the current event is a minimum.

Advantageously, the random phase error associated with the symbol length retained is used to adjust a clock phase serving to detect the first-symbol length. The process is further improved when the aggregate of absolute values of random phase errors is increased for each event state corresponding to a first-symbol length outside of an interval of allowable lengths.

Another aspect of the present invention is directed to a device for evaluating a symbol length comprising a correction circuit designed to receive as input a first-symbol length and a phase error with regard to detection of a length of the first symbol then to receive a length of the second symbol which follows the first symbol.

The device preferably comprises first and second subcircuits. The first subcircuit preferably evaluates at least two random phase errors on the basis of the phase error received. A first random phase error is dependent on a deterministic phase error with respect to a first state corresponding to an absence of correction of the first-symbol length. A second random phase error is dependent on a deterministic phase error with respect to a second state corresponding to correction of the first-symbol length.

The second subcircuit preferably retains as an evaluated symbol length the first-symbol length received if the absolute value of the first random phase error minimizes a condition of passing through the first state. Also retained as an evaluated symbol length is the corrected first-symbol length if the absolute value of the second random phase error minimizes the condition of passing through the second state.

More particularly, the device preferably comprises a third subcircuit containing at least for each possible symbol length a systematic phase error at the end of the first symbol and a systematic phase error at the start of the second symbol. The first subcircuit is then designed for calculating the first deterministic phase error by taking a difference between two systematic phase errors contained in the subcircuit for uncorrected lengths, and for calculating the second deterministic phase error by taking a difference between two systematic phase errors contained in the third subcircuit for lengths corrected by an increase and a decrease of a clock period respectively of the first-symbol length and of the second-symbol length.

The device is improved when the first subcircuit is designed for evaluating relative to a current event, eight random phase errors, four of which are dependent on a deterministic phase error for each of four first states corresponding to an absence of correction of the first-symbol length, four of which are dependent on a deterministic phase error for each of four second states corresponding to a correction of first-symbol length. The second subcircuit is designed for retaining the symbol length corresponding to the state of a preceding event for which the content of at least one word is a minimum such that the first subcircuit is designed for aggregating therein absolute values of random phase errors for each event state going from the preceding event to the current event.

Advantageously, the second subcircuit is designed for generating a value of a random phase error associated with the symbol length retained, usable for adjusting a clock phase in a phase-locked circuit designed for transmitting the first-symbol length to the correction circuit. The device is further improved when the subcircuit is designed for increasing the content of each word for each event state corresponding to a first-symbol length outside of an interval of allowable lengths.

DETAILED DESCRIPTION OF THE PREFERRED EMBODIMENTS

Figure 1:
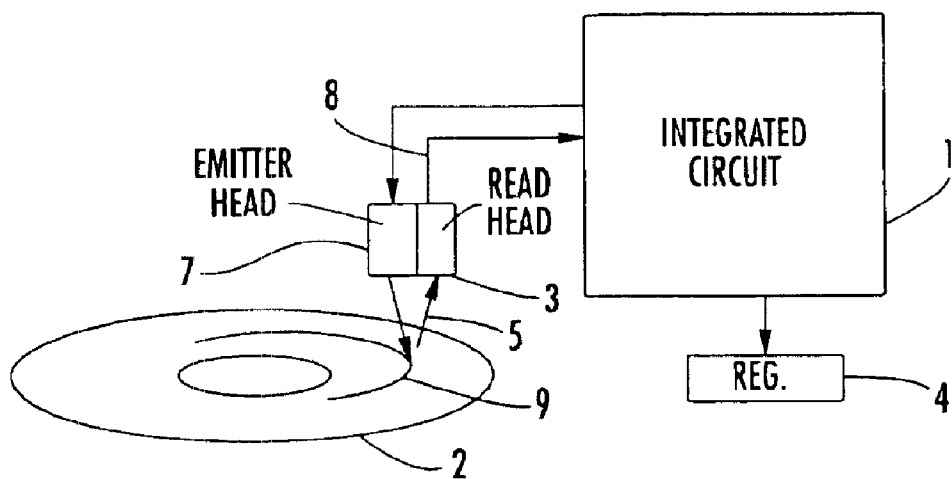
FIG. 1 shows a system for reading a prerecorded medium in accordance with the present invention.

With reference to FIG. 1, a system for reading information on a pre-recorded medium 2 comprises a reading head 3 and an integrated circuit 1 for placing the read information in a register 4. In the example of FIG. 1, the pre-recorded medium 2 is a laser disk, such as a compact disk (CD) or digital video disk (DVD). The medium 2 comprises a track 9 that is followed by the reading head 3 using a known micromechanism (not represented). An emitter head 7, integral with the reading head 3, emits in a known manner an incident laser light beam whose reflection off the track 9 generates a light beam 5 received by the reading head 3.

Figure 2:
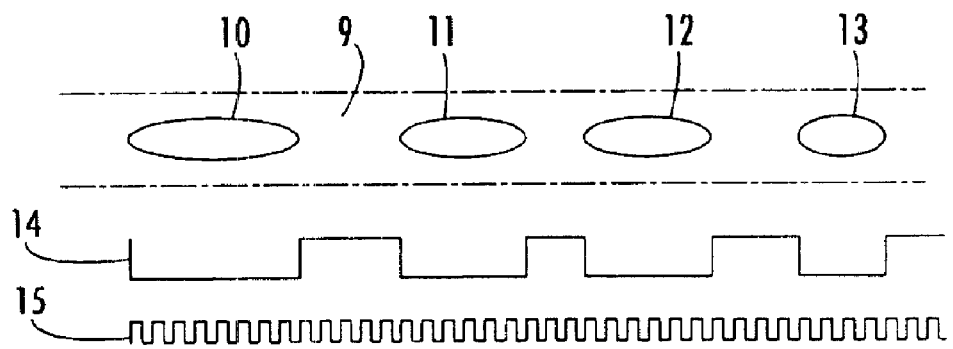
FIG. 2 shows a principle of coding a recording medium in accordance with the present invention.

With reference to FIG. 2, the track 9 of the medium 2 comprises a succession of oblong holes 10, 11, 12, 13. The presence of a hole corresponds to a first level, for example, a low of a binary variable 14. The absence of a hole corresponds to the second level, for example, a high of the binary variable 14. Each alternating length of the variable 14 represents a symbol of specified value determined by the length of a hole or by the length which separates two holes. This length is measured as a quantity of periods of a spatial clock 15.

The binary variable 14 is evaluated by a signal 8 whose level is dependent on the laser light beam according to whether it results from a reflection of an incident beam in a hole or between two holes. The temporal variation of the signal 8 is representative of the spatial variation of the variable 14 by integration over time as a function of the linear running speed of the medium 2 under the reading head 3.

The spatial length of a symbol is thus measurable on the signal 8 as a quantity of periods of a time clock, which are related directly to the running speed of the medium 2 under the reading head 3. The time clock can be generated, for example, by an etching of the spatial clock 15 in a groove of the medium 2 which follows the track 9. The etching is generally of a period equal to an integer number of spatial-clock periods whose frequency is retrieved by frequency multiplication of a component of the signal 8, which is representative of variations of this etching.

Figure 3:
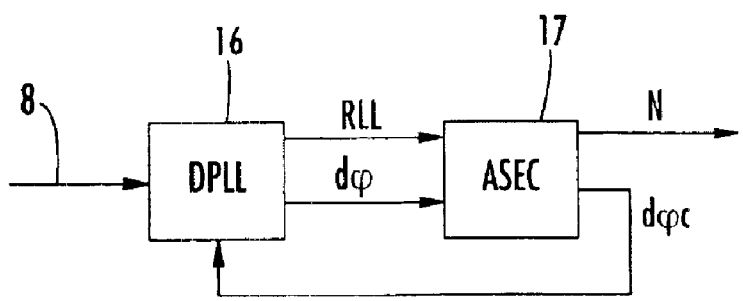
FIG. 3 shows a partial block diagram of the integrated circuit illustrated in FIG. 1.

With reference to FIG. 3, the integrated circuit 1 comprises a phase-locked circuit 16 designed for receiving as input the signal 8. The phase-locked circuit 16 is furnished with a phase-locked loop for counting in a known manner the quantity of clock periods per level of the signal 8 so as to retrieve a length RLL for each level, which is representative of a symbol length as given by the variable 14.

Figure 4:
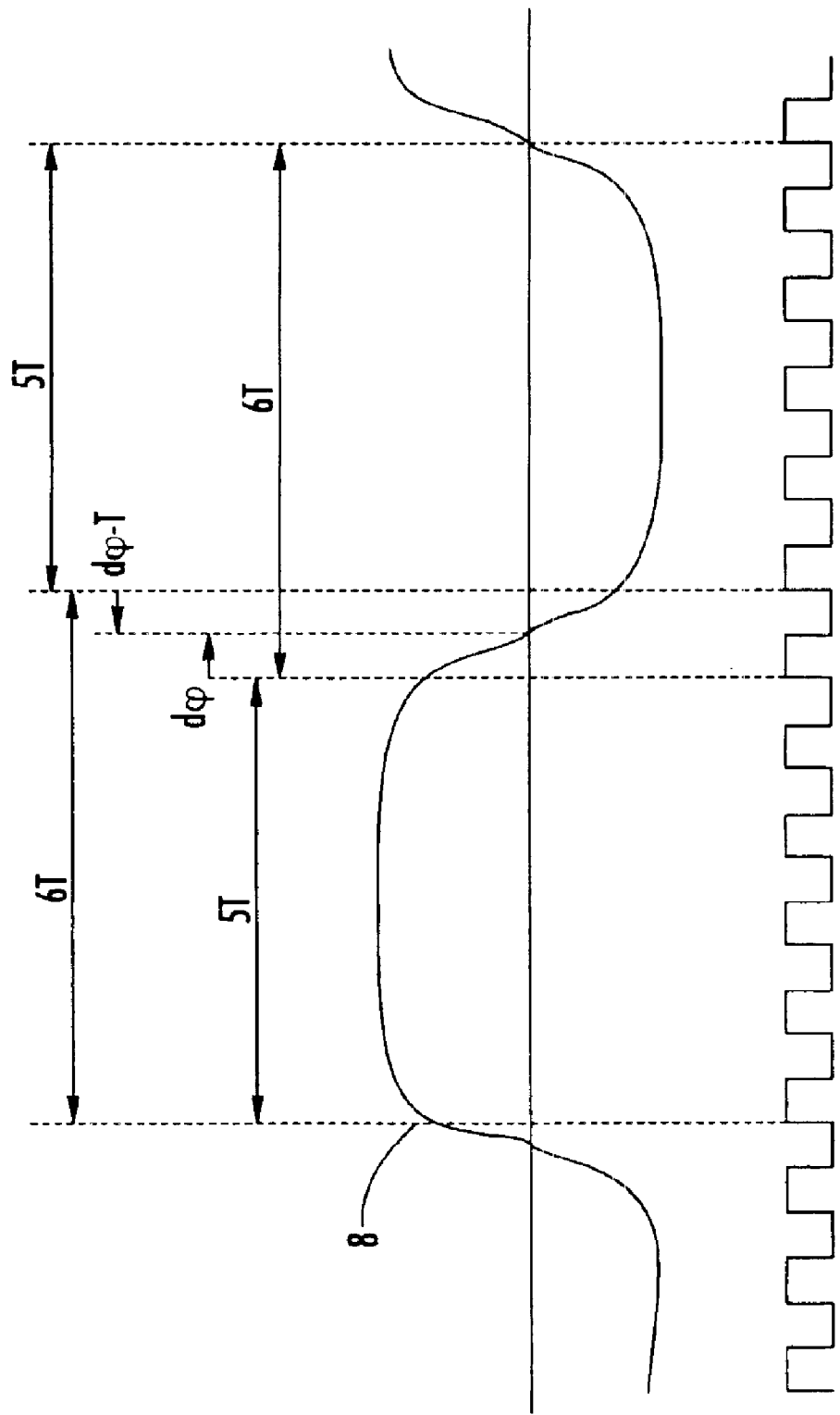
FIG. 4 shows a signal to be processed in accordance with the present invention.

However, the bandwidth of the transmission channel between the track 9 and the input of the phase-locked circuit 16 results from modulation of the reflected beam 5. This is from a transfer function of the reading head 3 and then from modulation of the signal 8 received as represented in FIG. 4. The signal 8 whose varying edges and whose amplitude do not constitute an exact image of the variable 14 generates errors with regard to the symbol length detections as given by the variable 14, that is, by the succession of holes and of absences of holes between two holes on the track 9. The wide rising and falling edges of the signal 8, compounded with a smaller amplitude for a short symbol length, mean that the crossings of a median value between two possible extreme levels of the signal 8 are not exactly in phase with the clock edges whose quantity of periods measure each symbol length. This results in uncertainty with regard to the detection of a symbol length.

This uncertainty is illustrated in FIG. 4 where two complete alternations of the signal 8 are representative of two successive symbols. The integer number of clock periods before the first complete alternation of the signal 8 crosses the median value is five. The phase-locked circuit 16 gives a length of 5T for the first symbol with a phase error $d\phi$ which results from the actual crossing of the median value by the signal 8 with a delay of dφ. The phase-locked loop of the circuit 16 associates the crossing of the median value with the closest clock edge. The integer number of clock periods before the second complete alternation of the signal 8 crosses the median value is six. The phase-locked circuit 16 gives a length of 6T for the second symbol. Before readjustment by the phase-locked loop, FIG. 4 shows a possible alternative evaluation of the length of the first symbol at 6T with a phase error equal to dφ−2π. To preserve a total length of two successive symbols, the length of the second symbol starting a clock period T later ought to be evaluated at 5T.

The phase-locked circuit 16, using as the sole criteria |dφ|<|dφ−2π|, is not designed to decide whether the second alternation is more representative of the variable 14. According to the invention with reference to FIG. 3, the integrated circuit 1 comprises a correction circuit 17 which receives as input each symbol length RLL and each associated phase error dφ, which are detected by the phase-locked circuit 16. On the basis of the values received as input for a succession of symbols, the correction circuit 17 generates for the register 4 a succession of estimated lengths N. The correction circuit 17 is also designed for generating a corrected phase error dφc for the phase-locked circuit 16 so as to improve the phase adjustment thereof. In this mode, the adjusting of coefficients PEp and PEC by the circuit 22 is then neutralized so as to take into account the correction phase errors dφc in such a way as to avoid instabilities caused by the competing of two adjustment systems. The internal phase adjustment by the phase-locked loop of the circuit 16 is satisfactory in terms of stability but it causes chatter or jitter in the absolute phase of the clock 15. The phase adjustment with a corrected phase error dφc given by the correction circuit 17 exhibits a mean absolute value less than that of dφ, thereby increasing the stability of the phase loop.

Figure 5:
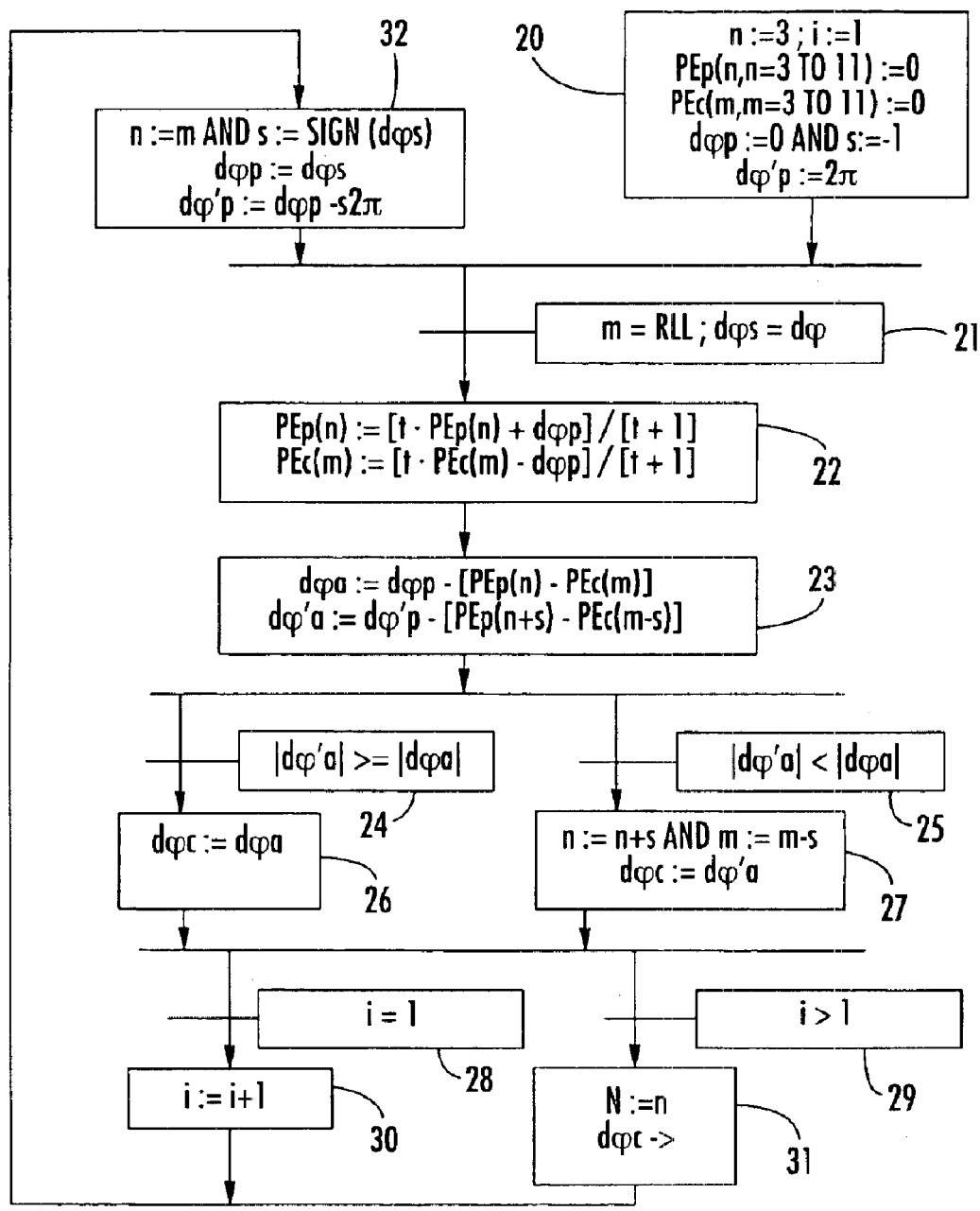
FIG. 5 shows process steps in accordance with the present invention.

FIG. 5 shows a loop of transitions and of steps 21 to 32 which are executed in real time in the correction circuit 17. Each receipt of a symbol length RLL and of a phase error dφ by the correction circuit 17 originating from the phase-locked circuit 16 confirms a transition 21.

In the transition 21, a first variable m has a value equal to the symbol length RLL received, which is the so-called second-symbol length. A second variable dφs has a value equal to the phase error dφ received, which is the so-called following phase error at the end of the second symbol. The transition 21 activates a step 23 of evaluating random phase errors.

In step 23, a first deterministic phase error is calculated for a first-symbol length which equals n. The first symbol is that which precedes the second symbol. The value of n results from a step 32 activated by a preceding execution of the loop of transitions and of steps 21 to 32. In the steady state, that is, after at least one execution of the loop, the value of n is equal to the value of m given by a preceding confirmation of the transition 21.

The first deterministic phase error PE(n,m) is representative of inter-symbol interference in the absence of noise. The absolute value of the amplitude of the modulated signal 8 is an increasing function of the length of the symbol associated therewith. This is on account of the bandwidth of the transmission channel. A high amplitude tends to systematically delay the amplitude sign change at a symbol end and to advance the amplitude sign change at a symbol start. A small amplitude tends to systematically advance the amplitude sign change at a symbol end and to delay the sign change at a symbol start.

Denoting by PEp(n) the systematic phase error at the end of the first symbol of length n and denoting by PEc(m) the systematic phase error at the start of the second symbol of length m in a run of two symbols of respective lengths n and m, the deterministic phase error PE(n,m) is given by the formula:

$$PE(n,m)=PEp(n)-PEc(m).$$

In the absence of noise on the transmission channel, the measured phase error dφp is substantially equal to the deterministic phase error PE(n,m). In the presence of white noise on the transmission channel, a random phase error is added to the deterministic phase error PE(n,m).

In step 23, a first random phase error dφa is calculated by deducting the deterministic phase error PE(n,m) from the measured phase error dφp. The measured phase error dφp is given by the phase-locked circuit 16 at the end of the first sequence of length n. The value of dφp results from step 32 activated by a preceding execution of the loop of transitions and of steps 21 to 32. In the steady state, that is, after at least one execution of the loop, the value dφp is taken equal in step 32 to the value dφs given by a preceding confirmation of the transition 21.

The measured phase error dφp is given by a time difference between a change of the sign of the signal 8 and the closest symbol clock edge divided by T/2π. The time difference dt is such that:

$$-T/2<dt<T/2.$$

If the period is measured in radians, T equals 2π. An alternative phase error dφ'$_p$ is given by the advance with which the amplitude of the modulated signal 8 changes phase before a last additional symbol clock alternation if the latter had been taken into account by the phase-locked circuit 16 so as to give a greater first-symbol length n+s. The alternative phase error is calculated via the formula:

$$d\phi'p=d\phi p-2\pi \text{ if } d\phi p \text{ is positive; and}$$

$$d\phi'p=d\phi p+2\pi \text{ if } d\phi p \text{ is negative or zero.}$$

In the subsequent description we consider a variable of sign s which equals +1 if dφp is positive, and which equals −1 if dφp is negative or zero. In step 23, a second deterministic error is calculated for a first-sequence length which equals n+s. The first symbol is that which precedes the second symbol. The length of the second symbol is taken equal to m−s so as to preserve the number of symbol clock alternations over a succession of two symbols.

The second deterministic phase error PE(n+s,m−s) is then given by the formula:

$$PE(n+s,m-s)=PEp(n+s)-PEc(m-s).$$

In step 23, a second random phase error dφ'a is calculated by deducting the deterministic phase error PE(n+s,m−s) from the alternative phase error dφ'p. The alternative error dφ'p is calculated in the steady state by step 32 of a preceding execution of the loop by deducting the measured phase error dφp from T.

A first execution of the loop of transitions and of steps 21 to 32 is not preceded by any activation of step 32. The values of n, of dφp and of dφ'p are initialized in an initial step 20 activated on powering up the correction circuit 17. In the initial step 20, the value of n is arbitrarily taken equal to 3, the value of dϕp is arbitrarily taken equal to 0 and the value of dϕ'p is arbitrarily taken equal to T. The value of n is taken, for example, equal to 3 in a mode of coding where the symbol lengths lie between 3 and 11.

Step 23 makes it possible to retain for a succession of two symbols, the lengths which minimize the random phase error. The random phase error which has the highest probability of occurring when it is caused by white noise is regarded as the smallest random phase error.

On completion of step 23, a transition 24 is confirmed when the absolute value of the calculated second random phase error dϕ'a is greater than or equal to the absolute value of the first random phase error dϕa. A transition 25 is confirmed when the absolute value of the second random phase error dϕ'a is less than the absolute value of the first random phase error dϕa calculated in step 23.

The transition 24 activates a step 26 in which a corrected phase error dϕc is taken equal to the first random phase error dϕa, hence the smallest. The transition 25 activates a step 27. Step 27 is therefore activated when the second random phase error dϕ'a is less in absolute value than the first random phase error dϕa.

In step 27, the length n of the first symbol is increased, respectively increased by one unit, and the length of the second symbol is decreased, respectively decreased by one unit so as to preserve the total length of the symbols, if the measured phase error dϕp is positive, respectively negative or zero. It is indeed in this case the estimated lengths n and m of the symbols which lead to a random phase error dϕ'a which is the smallest in absolute value over a zero-crossing of the signal 8. The corrected phase error dϕc is taken equal to the second random phase error dϕ'a, hence the smallest in absolute value.

On completion of step 26 or step 27, a transition 28 is confirmed when a loop index i is equal to 1. The index i, set to 1 in step 20, indicates a first execution of the loop when it is equal to 1. A transition 29 is confirmed when the index i is greater than 1. The transition 28 activates a step 30 which increments the index i so as to signify that steps 21 to 30 have been executed at least a first time.

A transition 29 activates a step 31 which outputs from the correction circuit 17, a symbol length N equal to n uncorrected on completion of step 26 or to n corrected on completion of step 27. On the first execution of step 23, step 31 is not executed and the value of n initialized in step 20 is not output from the correction circuit 17. Following the subsequent executions of step 23, step 30 is no longer executed and the successive values of N are output from the circuit 17. The corrected phase error dϕc is transmitted to the phase-locked circuit 16 for reclamping.

Step 32 is activated on completion of step 30 or step 31. The purpose of step 32 is to prepare a new execution of the loop after a new confirmation of the transition 21. In step 32, the first-symbol length n is taken equal to the second-symbol length m so that the second symbol considered for a preceding confirmation of the transition 21 is regarded as the first symbol for a following confirmation of the transition 21. The measured phase error dϕp between first and second symbols is taken equal to the phase error dϕs transmitted by the phase-locked circuit 16 in the preceding confirmation of transition 21. Step 32 calculates the alternative phase error dϕ'p by calculating the phase complementary to dϕp. In general:

$$d\phi p = d\phi s$$

$$d\phi' p = d\phi s - 2\pi \, \text{sign}(d\phi s).$$

Thus, except in the first confirmation of the transition 21, step 31 outputs from the circuit 17 a first-symbol length N for each confirmation of the transition 21, as a function of the current length n, that is, the length m for a preceding confirmation of the transition 21. Two successive confirmations of the transition 24 give a value of N equal to the value of m transmitted for a preceding confirmation of the transition 21. A confirmation of the transition 25 preceded by a confirmation of the transition 24 gives a value of N equal to m+s, that is, m+1 or m−1 depending on the value of s. A confirmation of the transition 24 preceded by a confirmation of the transition 25 gives a value of N equal to m−s, that is, m−1 or m+1 depending on the preceding value of s. Two successive confirmations of the transition 25 give a value of N equal to m for two successive values of s of like sign, which is equal to m−2 for a negative value of s preceded by a positive value of s, and equal to m+2 for a positive value of s preceded by a negative value of s.

The systematic phase errors denoted PEp(j) and PEc(j), with j varying from 3 to 11, for example, can be determined a priori by theoretical considerations regarding the bandwidth of the transmission channel. These systematic errors are then stored in the form of a table in a permanent memory of the correction circuit 17. This table, referenced by the index j, is then accessed by step 23, replacing j by n, m, m+s or m−s depending on the systematic phase error required for the calculations.

However the bandwidth of the transmission channel is not always easy to evaluate. Moreover, it can vary as a function of the conditions of use of reading the optical disk. Advantageously, the loop described with reference to FIG. 5 comprises a step 22 activated by the transition 21, preferably before step 23.

Step 22 calculates PEp(j) for j=n, as being a sliding average of the measured phase errors when the length of the first symbol is equal to n. Indeed, we saw earlier that the measured phase error is composed of a random phase error dϕa and of a deterministic error:

$$d\phi p = d\phi a + PEp(n) - PEc(m).$$

The average of a sum is equal to the sum of the averages. The average of the measured phase errors is equal to the sum of the average of the random phase errors dϕa and of the average of the deterministic phase errors. By definition of white noise from which random phase errors originate, the average of the random phase errors dϕa is zero for a sufficiently large number of samples.

With n fixed, PEp(n) is a constant and its average is equal to this constant. Since no symbol clock alternation is lost, the average of the deterministic errors for all the possible combinations of the first symbol of length n and of the second symbol of length m is zero. The statistical distribution of the lengths m of the second symbol which follows the first symbol is equiprobable. The average of the systematic phase errors PEc(m) with fixed n is zero for a sufficiently large quantity of samples. Thus, for a sufficiently large quantity of samples and in so far as few decoding errors are made, the average of the measured phase errors dϕp with n fixed is equal to the systematic error PEp(n).

Step 22 also calculates PEc(j) for j=m as being an average with a reversed sign of the measured phase errors when the length of the second symbol is equal to m. By applying the above reasoning to the equation:

$$-d\phi p = -d\phi a - PEp(n) + PEc(m).$$

We note that the average of the phase errors measured while reversing the sign is equal to PEc(m) for fixed m and a sufficiently large quantity of samples. An elegant way of continuously updating the averages as and when symbol lengths and phase errors are received, includes using low-pass filters receiving the measured phase error dϕp or −dϕp respectively as an input, and each is respectively activated by receipt of a first-symbol length n or a second-symbol length m.

The correction circuit 17 contains in a memory register a first-symbol length n and a measured phase error dϕp at the end of the first symbol. Moreover, in a first table, the correction circuit 17 contains a previously evaluated value of a systematic phase error PEp(n) at the end of the first symbol of length n. On powering up the circuit 17, this value is initialized in the initial step 20, for example, to a zero value. This value can also be initialized to a predetermined constant specified as a function of theoretical considerations regarding the bandwidth of the channel.

After confirmation of the transition 21, the previously evaluated error PEp(n) is multiplied by a coefficient t greater than 1, then summed with the measured phase error dϕp. The result thus obtained is divided by t+1 to give a new evaluation of the systematic error PEp(n) placed in the first table.

In a second table, the correction circuit 17 contains a previously evaluated value of systematic phase error PEc(m) at the start of the second symbol of length m. On powering up the circuit 17, this value is initialized in step 20, for example, to a zero value. This value may also be initialized to a predetermined constant specified as a function of theoretical considerations regarding the bandwidth of the channel.

After confirmation of the transition 21, which gives the second-symbol length m, the previously evaluated error PEc(m) is multiplied by the coefficient t and then summed with the measured phase error dϕp whose sign is reversed. The division of the result thus obtained by t+1 gives a new evaluation of the systematic error PEc(m) placed in the second table.

The values output by the filters which have just been described each converge to an average PEp(n) and PEc(m), evaluated in real time for a sufficient number of executions of the loop. The current technology makes it possible to construct fast arithmetic and logic processing units. It is conceivable to integrate such a unit into the circuit 17 with a microprogram loaded into a permanent memory so as to execute the loop described with reference to FIG. 5.

To obtain better performance in terms of processing speed, it is also conceivable to integrate the various transitions and steps of the loop in the form of a combination of circuits in the circuit 17.

With reference to FIG. 5, a description has just been given of a detector of a first-symbol length N which implements an algorithm receiving as input a succession of lengths of two symbols, and a phase error measured between the two symbols. For a first-symbol length equal to a second-symbol length m received, the length N is equal to m−2, m−1, m, m+1 or m+2 as a function of the phase error received with the length m and of a phase error received previously. The symbol lengths are therefore estimated in real time per sequence of two symbols which overlap. The second symbol of a preceding sequence forms the first symbol of a following sequence.

Let us consider an event of index k for which the correction circuit 17 receives a first-symbol length $l_k$, a second-symbol length $l_{k+1}$ and a phase error $d\phi_k$ between the first and the second symbol. The sign of $d\phi_k$ is denoted $s_k$. In the process explained with reference to FIG. 5, in order to assess the most probable random phase error, the first deterministic phase error PE(n,m) was generated without correcting n and m, and the second deterministic phase error PE(n+s,m−s) was generated for a correction of n and m. Had there been no correction for the preceding event of index k−1, n would then have been equal to $l_k$. Had there been a correction, n would have been equal to $l_k-s_k$. Hence, the preceding event would have been taken into account. On the other hand, the following event would not have been taken into account since m would have been taken equal to $l_{k+1}$. However, if there is a correction for the following event, the value of m to be taken into account in generating the deterministic phase errors ought to be equal to $l_{k+1}+s_k$.

It is observed that there are eight possible random phase error states for a phase error $d\phi_k$ equal to dϕp in the event of index k. Let xxx denote each of these states where x is a binary variable equal to 0 or to 1:

a state x0x corresponds to an absence of correction for the event of index k;

a state x1x corresponds to a correction for the event of index k;

a state 0xx corresponds to an absence of correction for the event of index k−1;

a state 1xx corresponds to a correction for the event of index k−1;

a state xx0 corresponds to an absence of correction for the event of index k+1; and a state xx1 corresponds to a correction for the event of index k+1.

Figure 6:
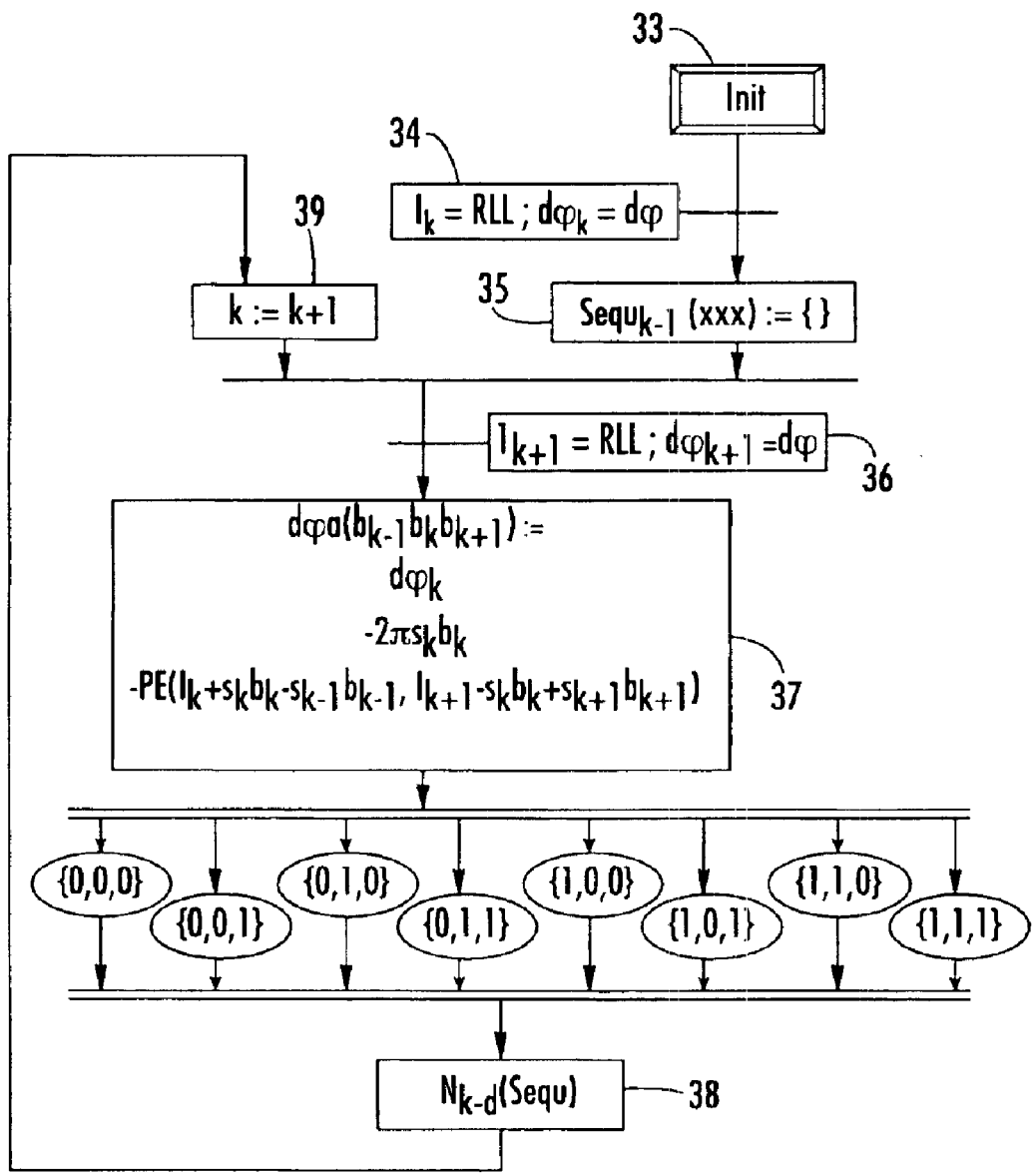
FIGS. 6 to 14 show improved-process steps in accordance with the present invention.

With reference to FIG. 6, an improved version of the process in accordance with the invention is now explained. In an initialization step 33, a current state index k is initialized to 1, eight variables termed path $Path_{k-1}(xxx)$ of index k−1 to 0 are initialized to zero, each for a state {x,x,x} from among eight states {0,0,0}, {0,0,1}, {0,1,0}, {0,1,1}, {1,0,0}, {1,0,1}, {1,1,0}, {1,1,1}. A path variable of index k greater than 0 represents a distance over a path so as to arrive at the corresponding state {x,x,x} when a $k^{th}$ event occurs.

On completion of step 33, a transition 34 is confirmed when the correction circuit 17 receives from the phase-locked circuit 16 a symbol length RLL which gives a current event length $l_k$, and a phase error dϕ which gives a current event phase error $d\phi_k$.

The transition 34 activates a step 35. In step 35 are initialized to the empty set eight series $Sequ_{k-1}(xxx)$, of index k−1 to zero, each for a state {x,x,x} from among eight states {0,0,0}, {0,0,1}, {0,1,0}, {0,1,1}, {1,0,0}, {1,0,1}, {1,1,0}, {1,1,1}. A series of index k greater than 0 is a run of symbol lengths whose last length is that estimated for the corresponding state {x,x,x} when a $k^{th}$ event occurs.

On completion of step 35, a transition 36 is confirmed when the correction circuit 17 receives from the phase-locked circuit 16 a symbol length RLL which gives a length $l_{k+1}$ of an event following the current event, and a phase error dϕ which gives a phase error $d\phi_k$ of the event following the current event. The transition 36 activates a step 37. In step 37 are calculated eight possible random errors, each for one of the possible states cited above.

Considering the state {0,0,0}, there is no correction of the length $l_k$ received, neither for the current event of index k, nor for a preceding event of index k−1. There is no correction of the length $l_{k+1}$ received, neither for the current event of index k, nor for a following event of index k+1. The random phase error dϕa(000) would be zero if the phase error $d\phi_k$ received were equal to a systematic phase error $PE(l_k, l_{k+1})$. The phase error $d\phi_k$ received could comprise a non-zero random phase error segment dϕa(000):

$$d\phi a(000)=d\phi_k-PE(l_k, l_{k+1}).$$

The systematic phase error $PE(l_k, l_{k+1})$ is available in memory or calculated in the correction circuit 17 by the formula:

$$PE(l_k, l_{k+1}) = PEp(l_k) - PEc(l_{k+1}).$$

The systematic phase error $PE(l_k, l_{k+1})$ is then deducted from the phase error $d\phi_k$ received so as to obtain the random phase error $d\phi a(000)$.

Considering the state $\{0,0,1\}$, there is no correction of the length $l_k$ received, neither for the current event of index k, or for the preceding event of index k−1. There is no correction of the length $l_{k+1}$ received for the current event of index k. There is a correction for the following event of index k+1 which gives $l_{k+1}+s_{k+1}$. The random phase error $d\phi a(001)$ would be zero if the phase error $d\phi_k$ received were equal to a systematic phase error $PE(l_k, l_{k+1}+s_{k+1})$. The phase error $d\phi_k$ received could comprise a non-zero random phase error segment $d\phi a(001)$:

$$d\phi a(001) = d\phi_k - PE(l_k, l_{k+1}+s_{k+1}).$$

The systematic phase error $PE(l_k, l_{k+1}+s_{k+1})$ is available in memory or calculated in the correction circuit 17 by the formula:

$$PE(l_k, l_{k+1}+1) = PEp(l_k) - PEc(l_{k+1}+s_{k+1}).$$

The systematic phase error $PE(l_k, l_{k+1}+1)$ is then deducted from the phase error $d\phi_k$ received so as to obtain the random phase error $d\phi a(001)$.

Considering the state $\{0,1,0\}$, there is a correction of the length $l_k$ received for the current event of index k, which gives $l_k+s_k$, with no correction for a preceding event of index k−1. There is a correction of the length $l_{k+1}$ received which gives $l_{k+1}-s_k$ for the current event of index k, with no correction for the following event of index k+1. The random phase error $d\phi a(010)$ would be zero if the phase error $d\phi_k$ received were equal to T minus a systematic phase error $PE(l_k+1\ l_{k+1}-1)$. The phase error $d\phi_k$ received could comprise a non-zero random phase error segment $d\phi a(010)$:

$$d\phi a(010) = d\phi_k - 2\pi s_k - PE(l_k+s_k, l_{k+1}-s_k).$$

The systematic phase error $PE(l_k+s_k, l_{k+1}-s_k)$ is available in memory or calculated in the correction circuit 17 by the formula:

$$PE(l_k+s_k, l_{k+1}-s_k) = PEp(l_k+s_k) - PEc(l_{k+1}-s_k).$$

The difference at T of the systematic phase error $PE(l_k+s_k, l_{k+1}-s_k)$ is then deducted from the phase error $d\phi_k$ received so as to obtain the random phase error $d\phi a(010)$.

Considering the state $\{0,1,1\}$, there is a correction of the length $l_k$ received for the current event of index k, which gives $l_k+s_k$, with no correction for a preceding event of index k−1. There is a correction of the length $l_{k+1}$ received which gives $l_{k+1}-s_{k+1}$ for the current event of index k, and a correction for the following event of index k+1 which gives $l_{k+1}-s_k+s_{k+1}$. The random phase error $d\phi a(011)$ would be zero if the phase error $d\phi_k$ received were equal to T minus a systematic phase error $PE(l_k+s_k, l_{k+1}-s_k+s_{k+1})$ The phase error $d\phi_k$ received could comprise a non-zero random phase error segment $d\phi a(011)$:

$$d\phi a(011) = d\phi_k - 2\pi s_k - PE(l_k+s_k, l_{k+1}-s_k+s_{k+1}).$$

The systematic phase error $PE(l_k+s_k, l_{k+1}-s_k+s_{k+1})$ is available in memory or calculated in the correction circuit 17 by the formula:

$$PE(l_k+s_k, l_{k+1}) = PEp(l_k+s_k) - PEc(l_{k+1}-s_k+s_{k+1}).$$

The difference at T of the systematic phase error $PE(l_k+s_k, l_{k+1}-s_k+s_{k+1})$ is then deducted from the phase error $d\phi_k$ received so as to obtain the random phase error $d\phi a(001)$.

In general, considering the state $\{b_{k-1}, b_k, b_{k+1}\}$ with $b_{k-1}=0$ or 1, $b_k=0$ or 1, $b_{k+1}=0$ or 1, the random phase error $d\phi a$ is given for this state by the formula:

$$d\phi a(b_{k-1},b_k,b_{k+1}) = d\phi_k - 2\pi s_k b_k - PE(l_k+s_k b_k - s_{k-1} b_{k-1}, l_{k+1}-s_k b_k + s_{k+1} b_{k+1}).$$

Figure 7:
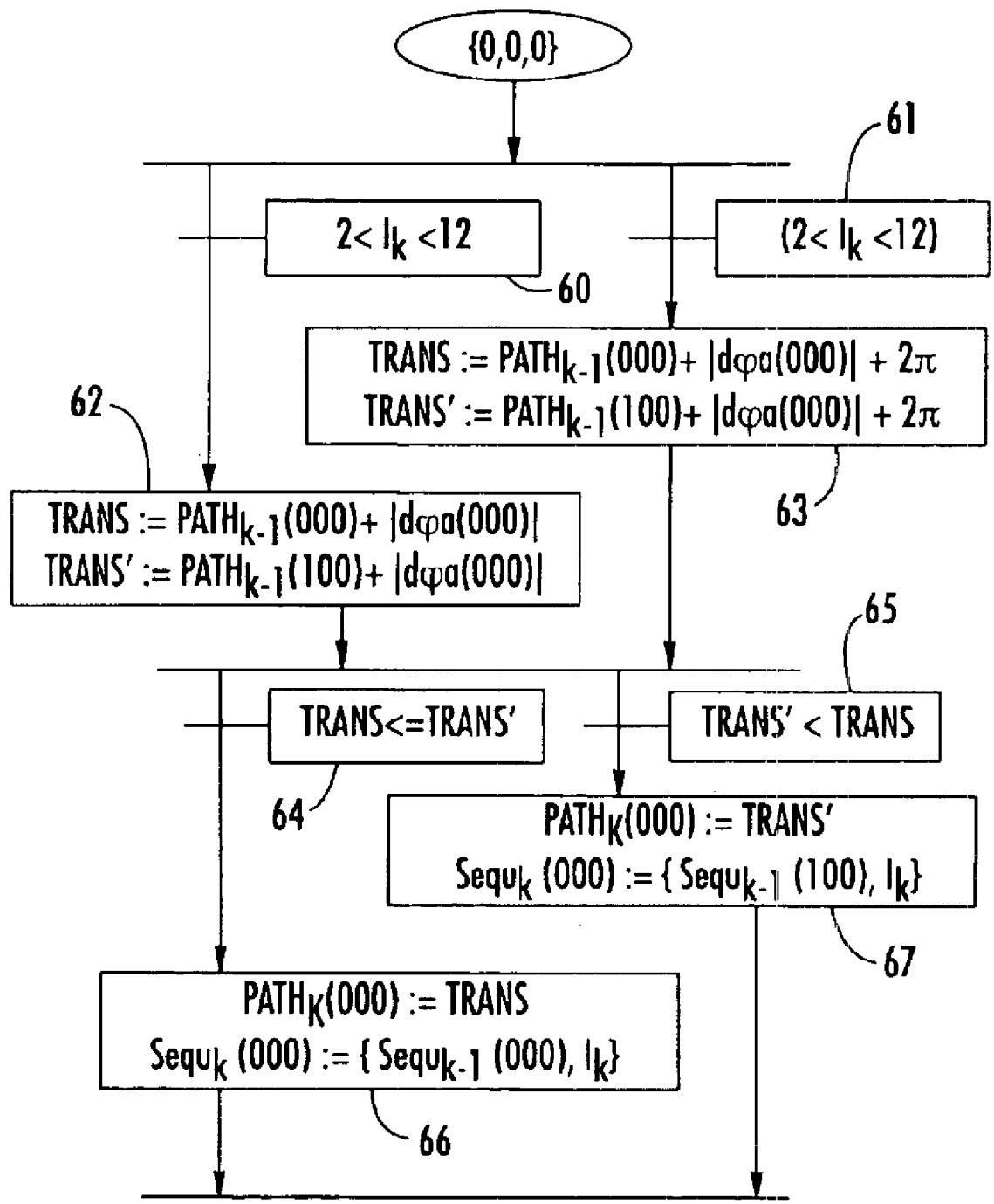

On completion of step 37 there are executed in succession or in parallel eight successions of steps, each respectively for the state $\{0,0,0\}$, $\{0,0,1\}$, $\{0,1,0\}$, $\{0,1,1\}$, $\{1,0,0\}$, $\{1,0,1\}$, $\{1,1,0\}$, $\{1,1,1\}$, described with reference to FIGS. 7 to 14. With reference to FIG. 7 for the state $\{0,0,0\}$ tied to the event of index k, two states tied to the preceding event of index k−1 may lead to the state $\{0,0,0\}$, namely the states $\{0,0,0\}$ and $\{1,0,0\}$.

In a step 62, the correction circuit 17 calculates two distances Trans and Trans' of possible paths for culminating at the state $\{0,0,0\}$. The distance Trans is taken equal to the sum of the absolute value of the random phase error $d\phi a(000)$ for the event of index k and of the distance of the path $Path_{k-1}(000)$ for culminating in the state $\{0,0,0\}$ of the event of index k−1 which may precede the current event of index k.

The distance Trans' is taken equal to the sum of the absolute value of the random phase error $d\phi a(000)$ for the event of index k and of the distance of the path $Path_{k-1}(100)$ for culminating in the state $\{1,0,0\}$ of the event of index k−1 which may precede the current event of index k. On completion of step 62, a transition 64 is confirmed when the distance Trans is less than or equal to the distance Trans', and a transition 65 is confirmed when the distance Trans' is less than the distance Trans.

The transition 64 activates a step 66 in which the correction circuit 17 calculates the distance of the path $Path_k(000)$ for culminating at the state $\{0,0,0\}$ of the current event of index k, and the sequence $Sequ_k(000)$ of the symbol lengths estimated for the state $\{0,0,0\}$ of the current event of index k. By taking the path distance $Path_k(000)$ equal to the distance Trans, the latter is the shortest for culminating in the state $\{0,0,0\}$ of the current event of index k since, by repeating a preceding calculation for the state $\{0,0,0\}$ of the event of index k−1, no path distance was less than the path distance $Path_{k-1}(000)$ for culminating in the state $\{0,0,0\}$ of the preceding event. The sequence Sequk(000) of the symbol lengths estimated for the state $\{0,0,0\}$ of the current event of index k is obtained by concatenating with the sequence $Sequ_{k-1}(000)$ of the symbol lengths estimated for the state $\{0,0,0\}$ of the preceding event of index k−1 as an additional element the length $l_k$ unmodified by the state $\{0,0,0\}$ of the current event of index k.

The transition 65 activates a step 67 in which the correction circuit 17 calculates the distance of the path $Path_k(000)$ for culminating at the state $\{0,0,0\}$ of the current event of index k, and the sequence $Sequ_k(000)$ of the symbol lengths estimated for the state $\{0,0,0\}$ of the current event of index k. By taking the path distance $Path_k(000)$ equal to the distance Trans', the latter is the shortest for culminating in the state $\{0,0,0\}$ of the current event of index k since, by repeating a preceding calculation for the state $\{1,0,0\}$ of the event of index k−1, no path distance was less than the path distance $Path_{k-1}(000)$ for culminating in the state $\{1,0,0\}$ of the preceding event. The sequence Sequk(000) of the symbol lengths estimated for the state $\{0,0,0\}$ of the current event of index k is obtained by concatenating with the sequence $Sequ_{k-1}(100)$ of the symbol lengths estimated for the state $\{1,0,0\}$ of the preceding event of index k−1, as additional element the length $l_k$ unmodified by the state $\{0,0,0\}$ of the current event of index k.

Figure 8:
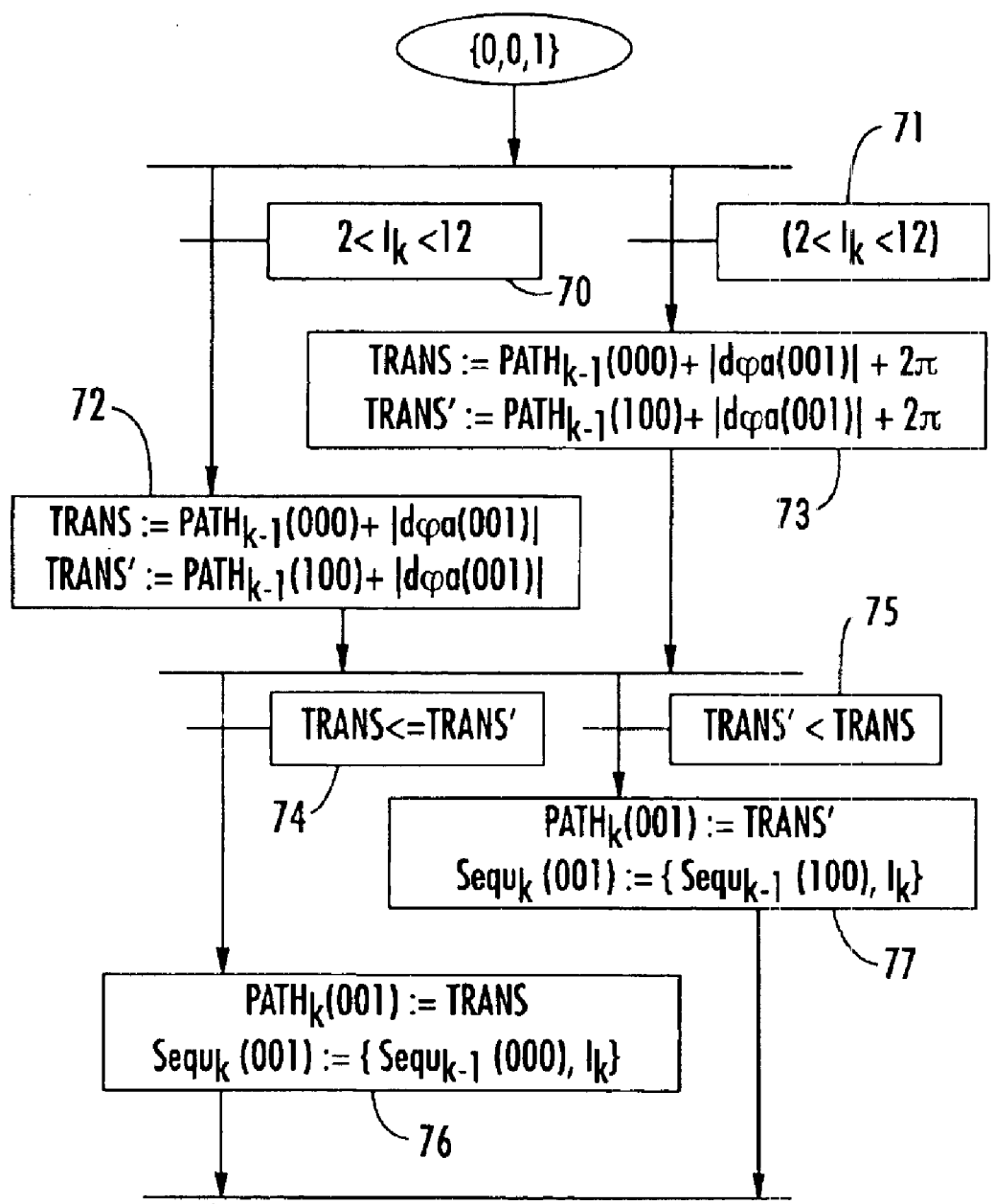

With reference to FIG. 8 for the state $\{0,0,1\}$ tied to the event of index k, two states tied to the preceding event of index k−1 may lead to the state $\{0,0,0\}$, namely the states $\{0,0,0\}$ and $\{1,0,0\}$. In a step 72, the correction circuit 17 calculates two distances Trans and Trans' of possible paths for culminating at the state $\{0,0,1\}$.

The distance Trans is taken equal to the sum of the absolute value of the random phase error dφa(001) for the event of index k, and of the distance of the path $Path_{k-1}(000)$ for culminating in the state $\{0,0,0\}$ of the event of index k−1 which may precede the current event of index k. The distance Trans' is taken equal to the sum of the absolute value of the random phase error dφa(001) for the event of index k, and of the distance of the path $Path_{k-1}(100)$ for culminating in the state $\{1,0,0\}$ of the event of index k−1 which may precede the current event of index k.

On completion of step 72, a transition 74 is confirmed when the distance Trans is less than or equal to the distance Trans', and a transition 75 is confirmed when the distance Trans' is less than the distance Trans.

The transition 74 activates a step 76 in which the correction circuit 17 calculates the distance of the path $Path_k(001)$ for culminating at the state $\{0,0,1\}$ of the current event of index k, and the sequence $Sequ_k(001)$ of the symbol lengths estimated for the state $\{0,0,1\}$ of the current event of index k. By taking the path distance $Path_k(001)$ equal to the distance Trans, the latter is the shortest for culminating in the state $\{0,0,1\}$ of the current event of index k since, by repeating a preceding calculation for the state $\{0,0,0\}$ of the event of index k−1, no path distance was less than the path distance $Path_{k-1}(000)$ for culminating in the state $\{0,0,0\}$ of the preceding event. The sequence $Sequ_k(001)$ of the symbol lengths estimated for the state $\{0,0,1\}$ of the current event of index k is obtained by concatenating with the sequence $Sequ_{k-1}(000)$ of the symbol lengths estimated for the state $\{0,0,0\}$ of the preceding event of index k−1, as an additional element the length $l_k$ of which is unmodified by the state $\{0,0,1\}$ of the current event of index k.

The transition 75 activates a step 77 in which the correction circuit 17 calculates the distance of the path $Path_k(001)$ for culminating at the state $\{0,0,1\}$ of the current event of index k, and the sequence $Sequ_k(001)$ of the symbol lengths estimated for the state $\{0,0,1\}$ of the current event of index k. By taking the path distance $Path_k(001)$ equal to the distance Trans', the latter is the shortest for culminating in the state $\{0,0,1\}$ of the current event of index k since, by repeating a preceding calculation for the state $\{1,0,0\}$ of the event of index k−1, no path distance was less than the path distance $Path_{k-1}(100)$ for culminating in the state $\{1,0,0\}$ of the preceding event. The sequence $Sequ_k(001)$ of the symbol lengths estimated for the state $\{0,0,1\}$ of the current event of index k is obtained by concatenating with the sequence $Sequ_{k-1}(100)$ of the symbol lengths estimated for the state $\{1,0,0\}$ of the preceding event of index k−1, as an additional element the length $l_k$ of which is unmodified by the state $\{0,0,1\}$ of the current event of index k.

Figure 9:
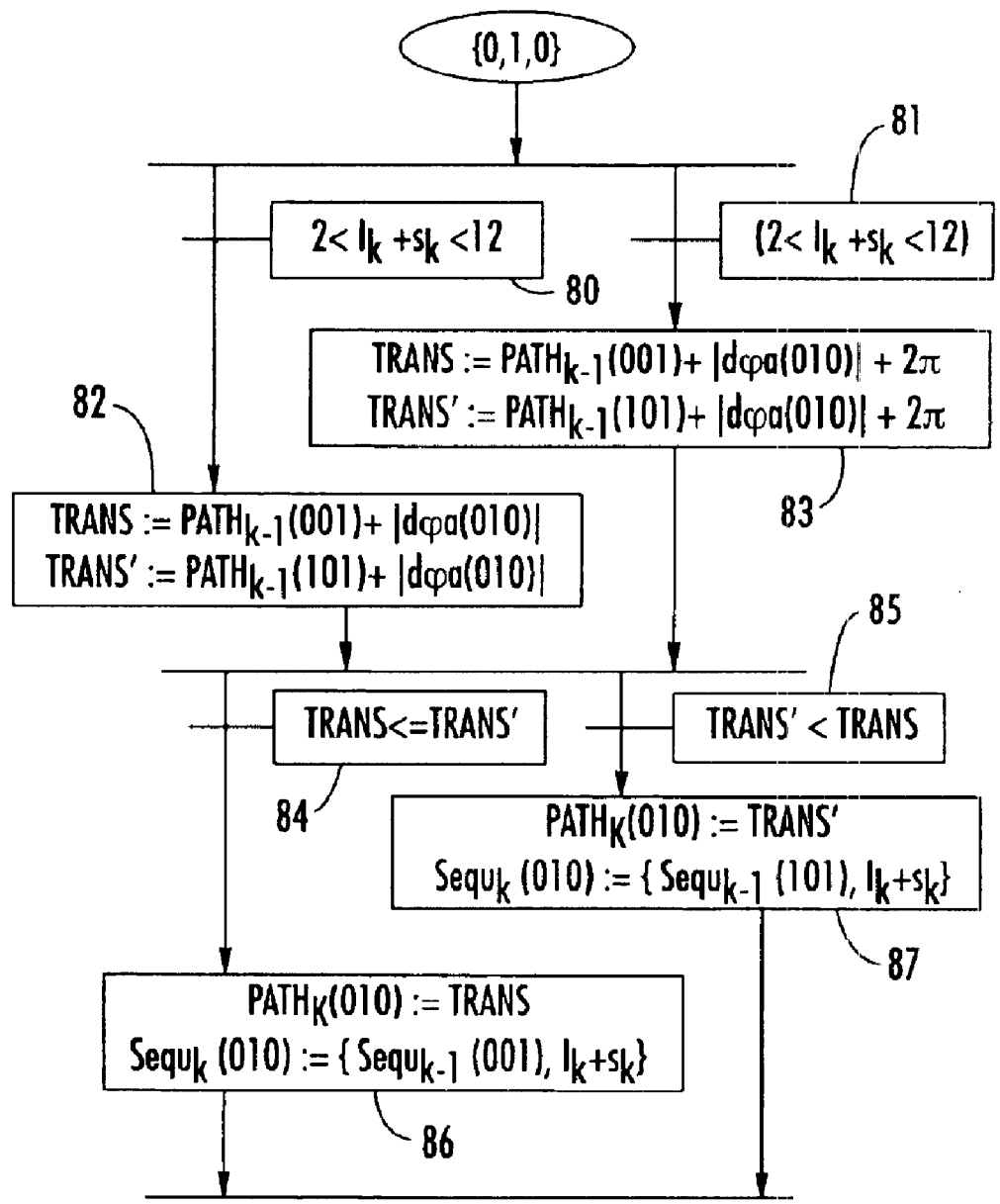

With reference to FIG. 9 for the state $\{0,1,0\}$ tied to the event of index k, two states tied to the preceding event of index k−1 may lead to the state $\{0,1,0\}$, namely the states $\{0,0,1\}$ and $\{1,1,1\}$. In step 82, the correction circuit 17 calculates two distances Trans and Trans' of possible paths for culminating in the state $\{0,1,0\}$.

The distance Trans is taken equal to the sum of the absolute value of the random phase error dφa(010) for the event of index k, and of the distance of the path $Path_{k-1}(001)$ for culminating in the state $\{0,0,1\}$ of the event of index k−1 which may precede the current event of index k. The distance Trans' is taken equal to the sum of the absolute value of the random phase error dφa(010) for the event of index k, and of the distance of the path $Path_{k-1}(101)$ for culminating in the state $\{1,0,1\}$ of the event of index k−1 which may precede the current event of index k.

On completion of step 82, a transition 84 is confirmed when the distance Trans is less than or equal to the distance Trans', and a transition 85 is confirmed when the distance Trans' is less than the distance Trans.

The transition 84 activates a step 86 in which the correction circuit 17 calculates the distance of the path $Path_k(010)$ for culminating in the state $\{0,1,0\}$ of the current event of index k, and the sequence $Sequ_k(010)$ of the symbol lengths estimated for the state $\{0,1,0\}$ of the current event of index k. By taking the path distance $Path_k(010)$ equal to the distance Trans, the latter is the shortest for culminating in the state $\{0,1,0\}$ of the current event of index k since, by repeating a preceding calculation for the state $\{0,0,1\}$ of the event of index k−1, no path distance was less than the path distance $Path_{k-1}(001)$ for culminating in the state $\{0,0,1\}$ of the preceding event. The sequence $Sequ_k(010)$ of the symbol lengths estimated for the state $\{0,1,0\}$ of the current event of index k is obtained by concatenating with the sequence $Sequ_{k-1}(001)$ of the symbol lengths estimated for the state $\{0,0,1\}$ of the preceding event of index k−1, as an additional element the length $l_k+s_k$ of which is modified by the state $\{0,1,0\}$ of the current event of index k.

The transition 85 activates a step 87 in which the correction circuit 17 calculates the distance of the path $Path_k(010)$ for culminating in the state $\{0,1,0\}$ of the current event of index k, and the sequence $Sequ_k(010)$ of the symbol lengths estimated for the state $\{0,1,0\}$ of the current event of index k. By taking the path distance $Path_k(010)$ equal to the distance Trans', the latter is the shortest for culminating in the state $\{0,1,0\}$ of the current event of index k since, by repeating a preceding calculation for the state $\{1,0,1\}$ of the event of index k−1, no path distance was less than the path distance $Path_{k-1}(101)$ for culminating in the state $\{1,0,1\}$ of the preceding event. The sequence $Sequ_k(010)$ of the symbol lengths estimated for the state $\{0,1,0\}$ of the current event of index k is obtained by concatenating with the sequence $Sequ_{k-1}(101)$ of the symbol lengths estimated for the state $\{1,0,1\}$ of the preceding event of index k−1, as an additional element the length $l_k+s_k$ of which is modified by the state $\{0,1,0\}$ of the current event of index k.

Figure 10:
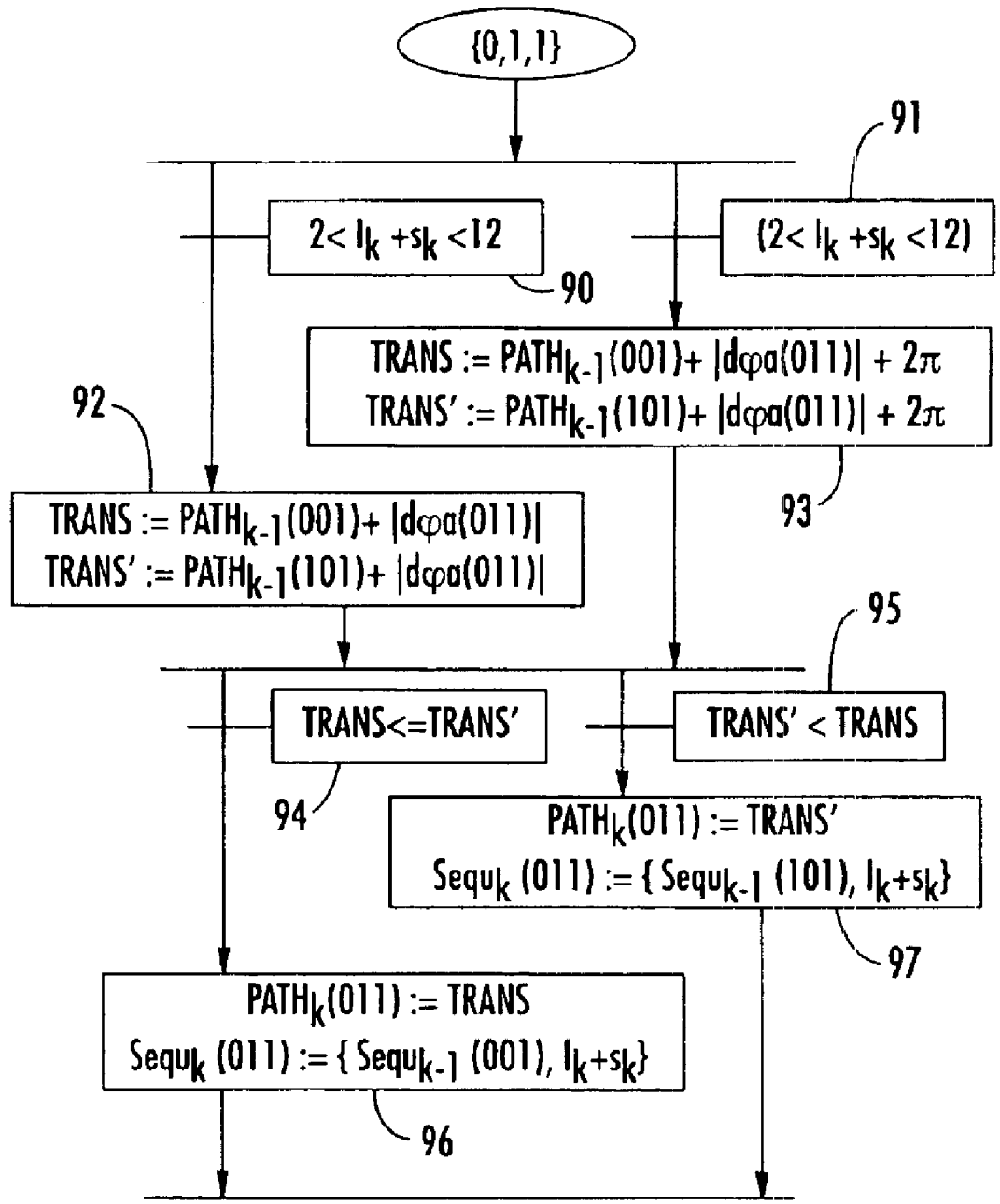

With reference to FIG. 10 for the state $\{0,1,1\}$ tied to the event of index k, two states tied to the preceding event of index k−1 may lead to the state $\{0,1,1\}$, namely the states $\{0,0,1\}$ and $\{1,0,1\}$. In step 92, the correction circuit 17 calculates two distances Trans and Trans' of possible paths for culminating in the state $\{0,1,1\}$.

The distance Trans is taken equal to the sum of the absolute value of the random phase error dφa(011) for the event of index k, and of the distance of the path $Path_{k-1}(001)$ for culminating in the state $\{0,0,1\}$ of the event of index k−1 which may precede the current event of index k. The distance Trans' is taken equal to the sum of the absolute value of the random phase error dφa(011) for the event of index k, and of the distance of the path $Path_{k-1}(101)$ for culminating in the state $\{1,0,1\}$ of the event of index k−1 which may precede the current event of index k.

On completion of step 92, a transition 94 is confirmed when the distance Trans is less than or equal to the distance Trans', and a transition 95 is confirmed when the distance Trans' is less than the distance Trans.

The transition 94 activates a step 96 in which the correction circuit 17 calculates the distance of the path $Path_k(011)$ for culminating in the state {0,1,1} of the current event of index k, and the sequence $Sequ_k(011)$ of the symbol lengths estimated for the state {0,1,1} of the current event of index k. By taking the path distance $Path_k(011)$ equal to the distance Trans, the latter is the shortest for culminating in the state {0,1,1} of the current event of index k since, by repeating a preceding calculation for the state {0,0,1} of the event of index k−1, no path distance was less than the path distance $Path_{k-1}(001)$ for culminating in the state {0,0,1} of the preceding event. The sequence $Sequ_k(011)$ of the symbol lengths estimated for the state {0,1,1} of the current event of index k is obtained by concatenating with the sequence $Sequ_{k-1}(001)$ of the symbol lengths estimated for the state {0,0,1} of the preceding event of index k−1, as an additional element the length $l_k+s_k$ of which is modified by the state {0,1,1} of the current event of index k.

The transition 95 activates a step 97 in which the correction circuit 17 calculates the distance of the path $Path_k(011)$ for culminating in the state {0,1,1} of the current event of index k, and the sequence $Sequ_k(011)$ of the symbol lengths estimated for the state {0,1,1} of the current event of index k. By taking the path distance $Path_k(011)$ equal to the distance Trans', the latter is the shortest for culminating in the state {0,1,1} of the current event of index k since, by repeating a preceding calculation for the state {1,0,1} of the event of index k−1, no path distance was less than the path distance $Path_{k-1}(101)$ for culminating in the state {1,0,1} of the preceding event. The sequence $Sequ_k(011)$ of the symbol lengths estimated for the state {0,1,1} of the current event of index k is obtained by concatenating with the sequence $Sequ_{k-1}(101)$ of the symbol lengths estimated for the state {1,0,1} of the preceding event of index k−1, as an additional element the length $l_k+s_k$ of which is modified by the state {0,1,1} of the current event of index k.

Figure 11:
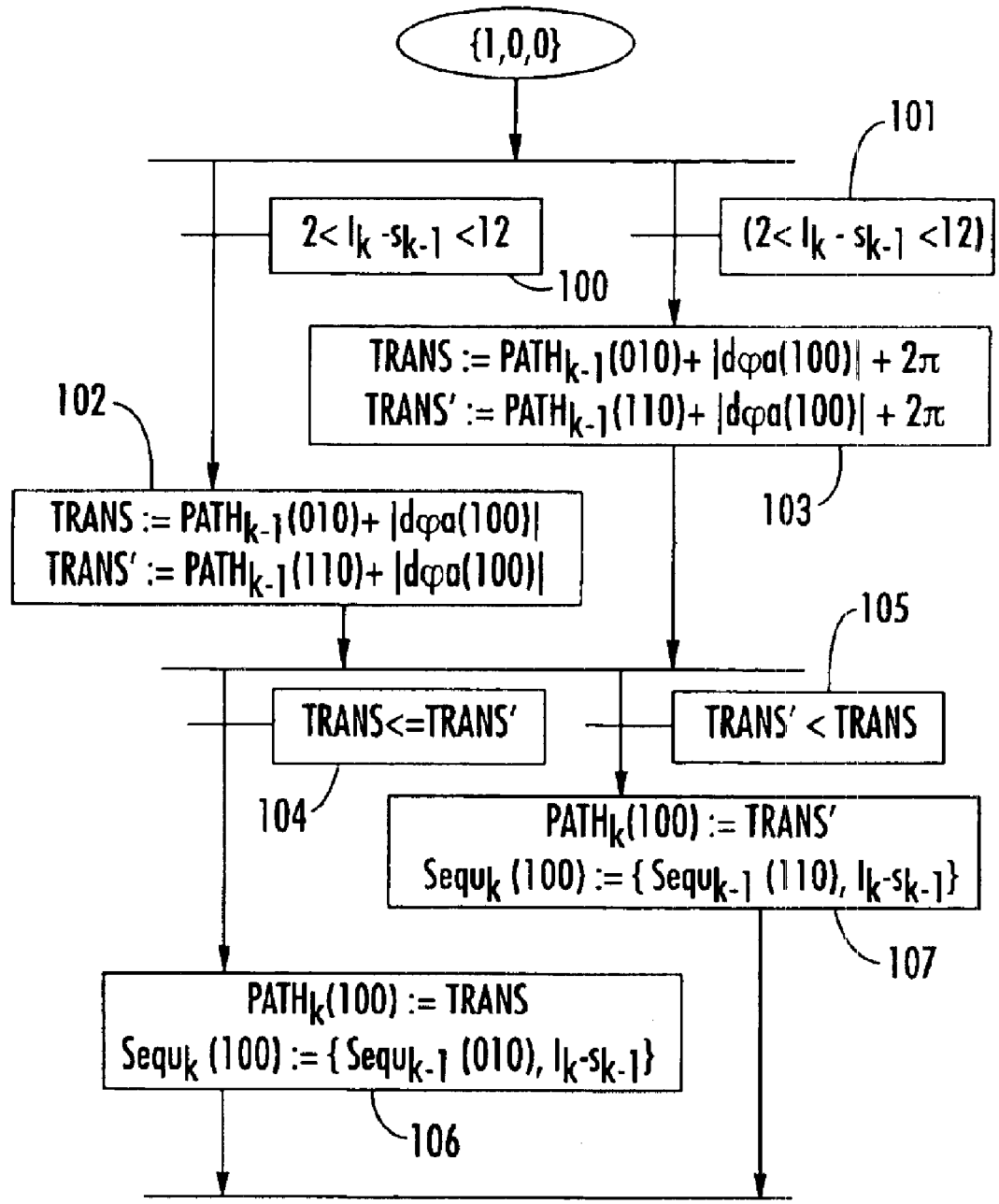

With reference to FIG. 11 for the state {1,0,0} tied to the event of index k, two states tied to the preceding event of index k−1 may lead to the state {1,0,0}, namely the states {0,1,0} and {1,1,0}. In a step 102, the correction circuit 17 calculates two distances Trans and Trans' of possible paths for culminating in the state {1,0,0}.

The distance Trans is taken equal to the sum of the absolute value of the random phase error $d\phi a(100)$ for the event of index k, and of the distance of the path $Path_{k-1}(010)$ for culminating in the state {0,1,0} of the event of index k−1 which may precede the current event of index k. The distance Trans' is taken equal to the sum of the absolute value of the random phase error $d\phi a(100)$ for the event of index k, and of the distance of the path $Path_{k-1}(110)$ for culminating in the state {1,1,0} of the event of index k−1 which may precede the current event of index k.

On completion of step 102, a transition 104 is confirmed when the distance Trans is less than or equal to the distance Trans', and a transition 105 is confirmed when the distance Trans' is less than the distance Trans.

The transition 104 activates a step 106 in which the correction circuit 17 calculates the distance of the path $Path_k(100)$ for culminating in the state {1,0,0} of the current event of index k, and the sequence $Sequ_k(100)$ of the symbol lengths estimated for the state {1,0,0} of the current event of index k. By taking the path distance $Path_k(100)$ equal to the distance Trans, the latter is the shortest for culminating in the state {1,0,0} of the current event of index k since, by repeating a preceding calculation for the state {0,1,0} of the event of index k−1, no path distance was less than the path distance $Path_{k-1}(010)$ for culminating in the state {0,1,0} of the preceding event. The sequence $Sequ_k(100)$ of the symbol lengths estimated for the state {1,0,0} of the current event of index k is obtained by concatenating with the sequence $Sequ_{k-1}(010)$ of the symbol lengths estimated for the state {0,1,0} of the preceding event of index k−1, as an additional element the length $l_k-s_{k-1}$ of which is modified by the state {1,0,0} of the current event of index k.

The transition 105 activates a step 107 in which the correction circuit 17 calculates the distance of the path $Path_k(100)$ for culminating in the state {1,0,0} of the current event of index k, and the sequence $Sequ_k(100)$ of the symbol lengths estimated for the state {1,0,0} of the current event of index k. By taking the path distance $Path_k(100)$ equal to the distance Trans', the latter is the shortest for culminating in the state {1,0,0} of the current event of index k since, by repeating a preceding calculation for the state {1,1,0} of the event of index k−1, no path distance was less than the path distance $Path_{k-1}(110)$ for culminating in the state {1,1,0} of the preceding event. The sequence $Sequ_k(100)$ of the symbol lengths estimated for the state {1,0,0} of the current event of index k is obtained by concatenating with the sequence $Sequ_{k-1}(110)$ of the symbol lengths estimated for the state {1,1,0} of the preceding event of index k−1, as an additional element the length $l_k-s_{k-1}$ of which is modified by the state {1,0,0} of the current event of index k.

Figure 12:
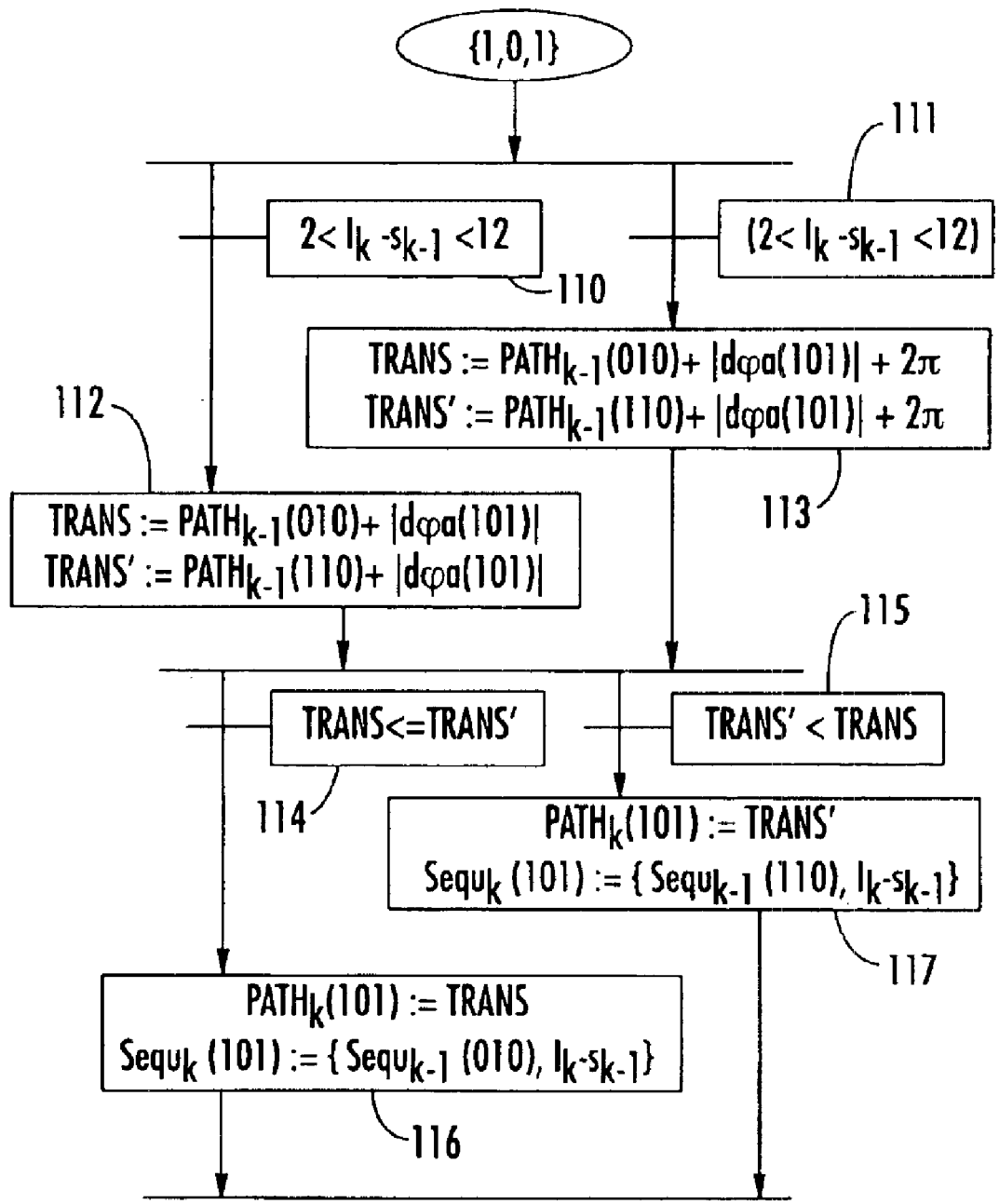

With reference to FIG. 12 for the state {1,0,1} tied to the event of index k, two states tied to the preceding event of index k−1 may lead to the state {1,0,0}, namely the states {0,1,0} and {1,1,0}. In a step 112, the correction circuit 17 calculates two distances Trans and Trans' of possible paths for culminating in the state {1,0,1}.

The distance Trans is taken equal to the sum of the absolute value of the random phase error $d\phi a(101)$ for the event of index k, and of the distance of the path $Path_{k-1}(010)$ for culminating in the state {0,1,0} of the event of index k−1 which may precede the current event of index k. The distance Trans' is taken equal to the sum of the absolute value of the random phase error $d\phi a(101)$ for the event of index k, and of the distance of the path $Path_{k-1}(110)$ for culminating in the state {1,1,0} of the event of index k−1 which may precede the current event of index k.

On completion of step 112, a transition 114 is confirmed when the distance Trans is less than or equal to the distance Trans' and a transition 115 is confirmed when the distance Trans' is less than the distance Trans.

The transition 114 activates a step 116 in which the correction circuit 17 calculates the distance of the path $Path_k(101)$ for culminating in the state {1,0,1} of the current event of index k, and the sequence $Sequ_k(101)$ of the symbol lengths estimated for the state {1,0,1} of the current event of index k. By taking the path distance $Path_k(101)$ equal to the distance Trans, the latter is the shortest for culminating in the state {1,0,1} of the current event of index k since, by repeating a preceding calculation for the state {0,1,0} of the event of index k−1, no path distance was less than the path distance $Path_{k-1}(010)$ for culminating in the state {0,1,0} of the preceding event. The sequence $Sequ_k(101)$ of the symbol lengths estimated for the state {1,0,1} of the current event of index k is obtained by concatenating with the sequence $Sequ_{k-1}(010)$ of the symbol lengths estimated for the state {0,1,0} of the preceding event of index k−1, as an additional element the length $l_k-s_{k-1}$ of which is modified by the state {1,0,1} of the current event of index k.

The transition 115 activates a step 117 in which the correction circuit 17 calculates the distance of the path Path$_k$(101) for culminating in the state {1,0,1} of the current event of index k, and the sequence Sequ$_k$(101) of the symbol lengths estimated for the state {1,0,1} of the current event of index k. By taking the path distance Path$_k$(101) equal to the distance Trans', the latter is the shortest for culminating in the state {1,0,1} of the current event of index k since, by repeating a preceding calculation for the state {1,1,0} of the event of index k−1, no path distance was less than the path distance Path$_{k-1}$(110) for culminating in the state {1,1,0} of the preceding event. The sequence Sequ$_k$(101) of the symbol lengths estimated for the state {1,0,1} of the current event of index k is obtained by concatenating with the sequence Sequ$_{k-1}$(110) of the symbol lengths estimated for the state {1,1,0} of the preceding event of index k−1, as an additional element the length $l_k-s_{k-1}$ of which is modified by the state {1,0,1} of the current event of index k.

Figure 13:
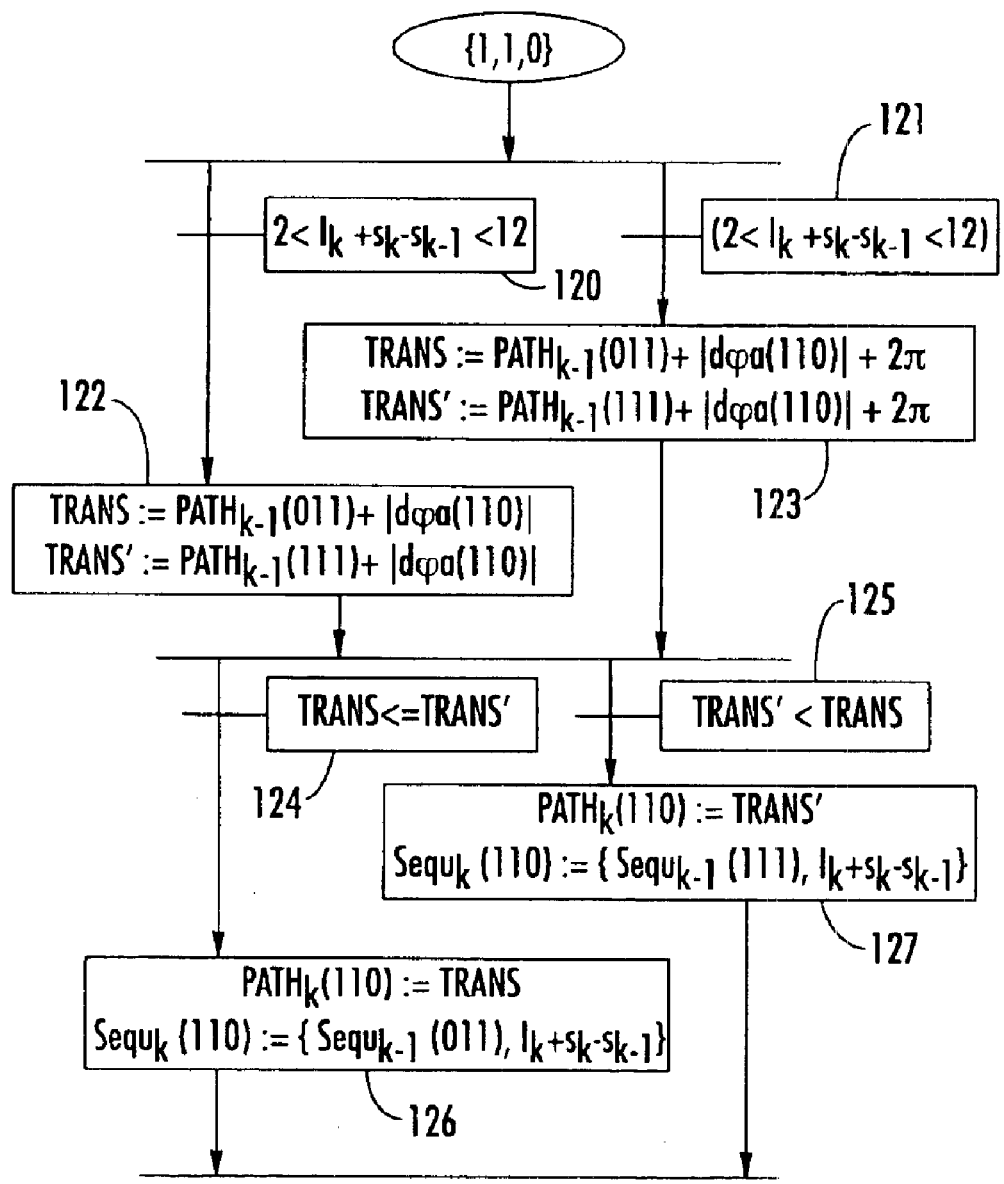

With reference to FIG. 13 for the state {1,1,0} tied to the event of index k, two states tied to the preceding event of index k−1 may lead to the state {1,1,0}, namely the states {0,1,1} and {1,1,1}. In a step 122, the correction circuit 17 calculates two distances Trans and Trans' of possible paths for culminating in the state {1,1,0}.

The distance Trans is taken equal to the sum of the absolute value of the random phase error dφa(110) for the event of index k, and of the distance of the path Path$_{k-1}$(011) for culminating in the state {0,1,1} of the event of index k−1 which may precede the current event of index k. The distance Trans' is taken equal to the sum of the absolute value of the random phase error dφa(110) for the event of index k, and of the distance of the path Path$_{k-1}$(111) for culminating in the state {1,1,1} of the event of index k−1 which may precede the current event of index k.

On completion of step 122, a transition 124 is confirmed when the distance Trans is less than or equal to the distance Trans', and a transition 125 is confirmed when the distance Trans' is less than the distance Trans.

The transition 124 activates a step 126 in which the correction circuit 17 calculates the distance of the path Path$_k$(110) for culminating in the state {1,1,0} of the current event of index k, and the sequence Sequ$_k$(110) of the symbol lengths estimated for the state {1,1,0} of the current event of index k. By taking the path distance Path$_k$(110) equal to the distance Trans, the latter is the shortest for culminating in the state {1,1,0} of the current event of index k since, by repeating a preceding calculation for the state {0,1,1} of the event of index k−1. No path distance was less than the path distance Path$_{k-1}$(011) for culminating in the state {0,1,1} of the preceding event. The sequence Sequ$_k$(110) of the symbol lengths estimated for the state {1,1,0} of the current event of index k is obtained by concatenating with the sequence Sequ$_{k-1}$(011) of the symbol lengths estimated for the state {0,1,1} of the preceding event of index k−1, as an additional element the length $l_k+s_k-s_{k-1}$ of which is modified by the state {1,1,0} of the current event of index k.

The transition 125 activates a step 127 in which the correction circuit 17 calculates the distance of the path Path$_k$(110) for culminating in the state {1,1,0} of the current event of index k, and the sequence Sequ$_k$(110) of the symbol lengths estimated for the state {1,1,0} of the current event of index k. By taking the path distance Path$_k$(110) equal to the distance Trans', the latter is the shortest for culminating in the state {1,1,0} of the current event of index k since, by repeating a preceding calculation for the state {1,1,1} of the event of index k−1, no path distance was less than the path distance Path$_{k-1}$(111) for culminating in the state {1,1,1} of the preceding event. The sequence Sequ$_k$(110) of the symbol lengths estimated for the state {1,1,0} of the current event of index k is obtained by concatenating with the sequence Sequ$_{k-1}$(111) of the symbol lengths estimated for the state {1,1,1} of the preceding event of index k−1, as an additional element the length $l_k+s_k-s_{k-1}$ of which is modified by the state {1,1,0} of the current event of index k.

Figure 14:
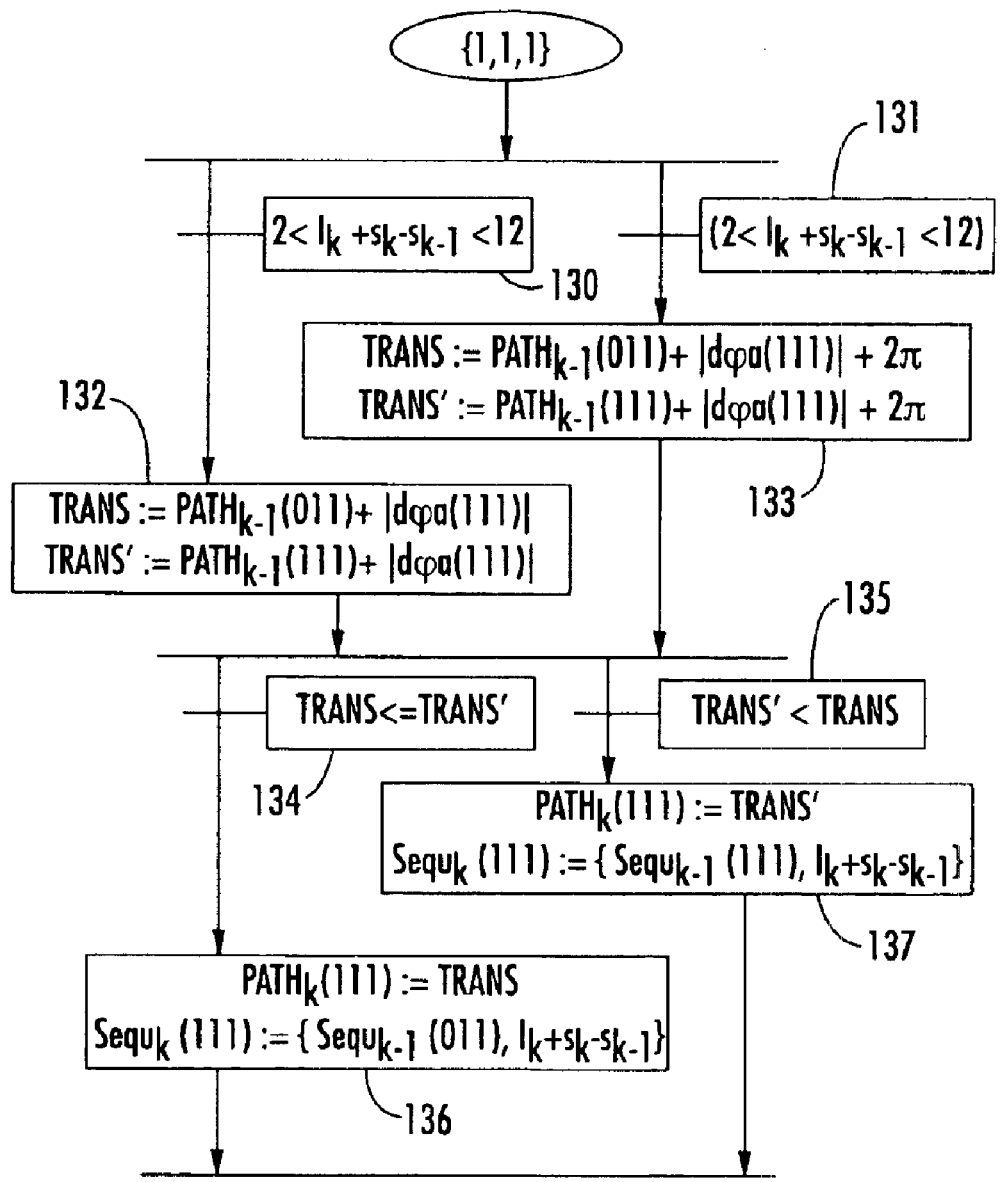

With reference to FIG. 14 for the state {1,1,1} tied to the event of index k, two states tied to the preceding event of index k−1 may lead to the state {1,1,0}, namely the states {0,1,1} and {1,1,1}. In a step 132, the correction circuit 17 calculates two distances Trans and Trans' of possible paths for culminating in the state {1,1,1}.

The distance Trans is taken equal to the sum of the absolute value of the random phase error dφa(111) for the event of index k, and of the distance of the path Path$_{k-1}$(011) for culminating in the state {0,1,1} of the event of index k−1 which may precede the current event of index k. The distance Trans' is taken equal to the sum of the absolute value of the random phase error dφa(111) for the event of index k, and of the distance of the path Path$_{k-1}$(111) for culminating in the state {1,1,1} of the event of index k−1 which may precede the current event of index k.

On completion of step 132, a transition 134 is confirmed when the distance Trans is less than or equal to the distance Trans', and a transition 135 is confirmed when the distance Trans' is less than the distance Trans.

The transition 134 activates a step 136 in which the correction circuit 17 calculates the distance of the path Path$_k$(111) for culminating in the state {1,1,1} of the current event of index k, and the sequence Sequ$_k$(111) of the symbol lengths estimated for the state {1,1,1} of the current event of index k. By taking the path distance Path$_k$(111) equal to the distance Trans, the latter is the shortest for culminating in the state {1,1,1} of the current event of index k since, by repeating a preceding calculation for the state {0,1,1} of the event of index k−1, no path distance was less than the path distance Path$_{k-1}$(011) for culminating in the state {0,1,1} of the preceding event. The sequence Sequ$_k$(111) of the symbol lengths estimated for the state {1,1,1} of the current event of index k is obtained by concatenating with the sequence Sequ$_{k-1}$(011) of the symbol lengths estimated for the state {0,1,1} of the preceding event of index k−1, as an additional element the length $l_k+s_k-s_{k-1}$ of which is modified by the state {1,1,1} of the current event of index k.

The transition 135 activates a step 137 in which the correction circuit 17 calculates the distance of the path Path$_k$(111) for culminating in the state {1,1,1} of the current event of index k, and the sequence Sequ$_k$(111) of the symbol lengths estimated for the state {1,1,1} of the current event of index k. By taking the path distance Path$_k$(111) equal to the distance Trans', the latter is the shortest for culminating in the state {1,1,1} of the current event of index k since, by repeating a preceding calculation for the state {1,1,1} of the event of index k−1, no path distance was less than the path distance Path$_{k-1}$(111) for culminating in the state {1,1,1} of the preceding event. The sequence Sequ$_k$(111) of the symbol lengths estimated for the state {1,1,1} of the current event of index k is obtained by concatenating with the sequence Sequ$_{k-1}$(111) of the symbol lengths estimated for the state {1,1,1} of the preceding event of index k−1, as an additional element the length $l_k+s_k-s_{k-1}$ of which is modified by the state {1,1,1} of the current event of index k.

The steps which have just been described with reference to FIGS. 6 to 14 demonstrate a particular implementation of a Viterbi detector for improving the quality of estimation of symbol lengths over sequences longer than two symbols, such as is carried out with reference to FIG. 5. The state xxx of each considered event of index k for estimating a symbol length on the basis of a received length of symbol $l_k$ of the current event, takes into account an estimation of random phase error dφa which results from a received phase error dφ at the end of the symbol of the current event of index k so as to perform a correction, state x1x, or no correction, state x0x. The estimation of random phase error dφa takes into account a correction, state 1xx, or an absence of correction, state 0xx, for the preceding event and a correction, state xx1, or an absence of correction, state xx0, for the following event. The state of an event of index k+1 depends only on the state of an event of index k, thus conforming to a Markov process required for the implementation of a Viterbi detector. The metric used is the absolute value of the estimation of random phase error dφa whose aggregate over a path for culminating at each possible state of the current event of index k is a minimum.

When a symbol length is known at the end of a sequence of symbols, it is sufficient to take from among the eight possible states of the event corresponding to the last symbol received, the state whose shortest path gives the known length. The sequence of lengths of symbols corresponding to this state is then the best estimate of sequence of symbol lengths received.

It is not always possible to determine a known symbol length at the end of a sequence, for example, for an infinite or overly long sequence which would require considerable memory resources. Advantageously with reference to FIG. 6, the process in accordance with the invention comprises step 38 executed by the correction circuit 17 on completion of the steps previously described with reference to FIGS. 7 to 14, executed for each of the possible states 000 to 111.

Considering a depth d of a series $Sequ_k(xxx)$ as being the quantity of the last elements of the series $Sequ_k(xxx)$ obtained for the state xxx of the event of index k, and it is known that the eight shortest paths for culminating at each of the eight possible states of the event of index k have a high probability of passing through the same state for an event of index k−d when the depth d is sufficiently large. This property is explained, for example, in the last paragraph of page 272 of the article by G. David Forney, Jr., "The Viterbi Algorithm", Proceedings of the IEEE, vol. 61, No. 3, March 1973, pages 268 to 278.

In step 38, the correction circuit 17 removes the first element of the eight series $Sequ_k(xxx)$ of d elements. These series were obtained before execution of step 38 so as to obtain eight series $Sequ_k(xxx)$ of d−1 elements after execution of step 38. Thus the memory room required in the correction circuit 17 to store the eight series is reduced to eight times d words. Each word is provided for storing an element such as, for example, a symbol length $l_i$ with i varying from 1 to k.

The correction circuit 17 chooses from among the eight elements removed an element which gives an estimate $N_{k-d}$ of symbol length for the event of index k−d. When the eight shortest paths for culminating at the eight possible states xxx of the event of index k, actually pass through the same state of the event of index k−d, the eight elements removed are identical and no selection criteria is necessary. However, it may happen that the eight paths do not all pass through the same state for the event of index k−d.

To remedy this problem, the correction circuit 17 can use a selection criteria based, for example, on a shorter path or on a majority vote. The selection criteria based on a shorter path includes retaining the element of index k−d of the series which corresponds to the shortest of the eight paths of the event of index k.

The selection criteria based on a majority vote includes retaining from among the eight elements of index k−d, that one which appears with the same value the largest number of times, or if several elements of distinct values appear the same number of times, in retaining one of them arbitrarily. It should be noted that for a symbol length $l_{k-d}$ received, the eight elements removed can take only one of five values:

$$l_{k-d}-2, l_{k-d}-1, l_{k-d}, l_{k-d}+1, l_{k-d}+2$$

and hence there exist at least two elements of identical values.

If d is taken sufficiently large, it is noted that the selection criteria is not indispensable since there exists an event of index j for j lying between k−d and k for which the eight shortest paths for culminating at the eight possible states of the event of index k pass through the same state. These eight paths pass through a unique shortest path for culminating at this same state of the event of index j. There then exists a single element for a single possible state of each event which precedes the event of index j. An optimal value of d can be obtained by simulations prior to forming the correction circuit 17.

On completion of step 38, a step 39 is activated in which the index k is incremented to a following confirmation of the transition 36, so as to loop the process in real time for symbol lengths RLL and phase errors dφ received for a run of events of increasing index k. Before having processed d events, a series in step 38 is of a depth less than d. A micro-software test can be provided in the correction circuit 17 for removing a first series element when the series depth is equal to or greater than d.

A straightforward approach is to design the correction circuit 17 with a shift register for each series processed. The shift register comprises d cells receiving as input the last element of a series, and generating as output the first element of this series. The content of the shift register is shifted towards the output for each execution of step 38.

In step 37, eight deterministic phase errors are calculated on the basis of five possible systematic phase errors at the end of a first symbol $PEp(l_k-2)$, $PEp(l_k-1)$, $PEp(l_k)$, $PEp(l_k+1)$, $PEp(l_k+2)$ and of five possible systematic phase errors at the start of a second symbol $PEc(l_{k+1}-2)$, $PEc(l_{k+1}-1)$, $PEc(l_{k+1})$ $PEc(l_{k+1}+1)$, $PEc(l_{k+1}+2)$. The systematic phase errors PEp and PEc can be determined beforehand for each possible symbol length and stored in the memory of the correction circuit 17. Just as for the process described with reference to FIG. 5, it is also possible to insert before or after step 37 a step similar to step 22, not represented in FIG. 6. The systematic phase error values PEp and PEc are initialized to predetermined values in step 33. For the event of index k, the systematic phase errors $PEp(l_k)$ and $PEc(l_{k+1})$ are adjusted in the inserted step, for example, by the formula:

$$PEp(l_k):=[t \cdot PEp(l_k)+d\phi_k]/[t+1]$$

$$PEc(l_{k+1}):=[t \cdot PEc(l_{k+1})-d\phi_k]/[t+1].$$

A first variation of the process makes it possible to reduce the necessary memory of the correction circuit 17.

In step 33 or 35, eight words of d+2 bits, each provided for storing a series $Sequ_{k-1}(xxx)$, of index k−1 equal to zero, corresponding to a state {x,x,x} from among eight states {0,0,0}, {0,0,1}, {0,1,0}, {0,1,1}, {1,0,0}, {1,0,1}, {1,1,0}, {1,1,1} are, for example, dubbed Wordp000, Wordp001, Wordp010, Wordp011, Wordp100, Wordp101, Wordp110, Wordp111. The d−1 high-order bits of each word are initialized to zero. The left high-order bits of the word and the right low-order bits of the word are considered. The three low-order bits of the word Wordp000 are initialized to 000.

The three low-order bits of the word Wordp001 are initialized to 001. The three low-order bits of the word Wordp010 are initialized to 010. The three low-order bits of the word Wordp011 are initialized to 011. The three low-order bits of the word Wordp100 are initialized to 100. The three low-order bits of the word Wordp101 are initialized to 101. The three low-order bits of the word Wordp110 are initialized to 110. The three low-order bits of the word Wordp111 are initialized to 111.

In step 35, the phase error $d\phi_k$ is stored in the input cell of a first shift register which comprises d+1 cells. The symbol length $l_k$ is stored in the input cell of a second shift register which comprises d+1 cells. In step 37, the phase error $d\phi_{k+1}$ is stored in the input cell of the first shift register with shifting of the content of the other d cells. The symbol length $l_{k+1}$ is stored in the input cell of the second register with shifting of the content of the other d cells.

With reference to FIG. 7 for the state {0,0,0} of the current event, the calculations of $Sequ_k(000)$ in steps 66 and 67 are replaced by the following calculations. A word of d+2 bits, dubbed for example Wordc000, is intended to contain the series $Sequ_k(000)$.

In step 66, the correction circuit 17 copies the d+1 low-order bits of the word Wordp000 into the d+1 high-order bits of the word Wordc000, and copies the value of the low-order bit which indicates the current state, here 0, into the low-order bit of the word Wordc000.

In step 67, the correction circuit 17 copies the d+1 low-order bits of the word Wordp100 into the d+1 high-order bits of the word Wordc000, and copies the value of the low-order bit which indicates the current state, here 0, into the low-order bit of the word Wordc000.

With reference to FIG. 8 for the state {0,0,1} of the current event, the calculations of $Sequ_k(001)$ in steps 76 and 77 are replaced by the following calculations. A word of d+2 bits, dubbed for example Wordc001, is intended to contain the series $Sequ_k(001)$.

In step 76, the correction circuit 17 copies the d+1 low-order bits of the word Wordp000 into the d+1 high-order bits of the word Wordc001, and copies the value of the low-order bit which indicates the current state, here 0, into the low-order bit of the word Wordc000.

In step 77, the correction circuit 17 copies the d+1 low-order bits of the word Wordp100 into the d+1 high-order bits of the word Wordc001, and copies the value of the low-order bit which indicates the current state, here 0, into the low-order bit of the word Wordc001.

With reference to FIG. 9 for the state {0,1,0} of the current event, the calculations of $Sequ_k(010)$ in steps 86 and 87 are replaced by the following calculations. A word of d+2 bits, dubbed for example Wordc010, is intended to contain the series $Sequ_k(010)$.

In step 86, the correction circuit 17 copies the d+1 low-order bits of the word Wordp001 into the d+1 high-order bits of the word Wordc010, and copies the value of the low-order bit which indicates the current state, here 0, into the low-order bit of the word Wordc010.

In step 87, the correction circuit 17 copies the d+1 low-order bits of the word Wordp101 into the d+1 high-order bits of the word Wordc010, and copies the value of the low-order bit which indicates the current state, here 0, into the low-order bit of the word Wordc010.

With reference to FIG. 10 for the state {0,1,1} of the current event, the calculations of $Sequ_k(011)$ in steps 96 and 97 are replaced by the following calculations. A word of d+2 bits, dubbed for example Wordc011, is intended to contain the series $Sequ_k(011)$.

In step 96, the correction circuit 17 copies the d+1 low-order bits of the word Wordp001 into the d+1 high-order bits of the word Wordc011, and copies the value of the low-order bit which indicates the current state, here 1, into the low-order bit of the word Wordc011.

In step 97, the correction circuit 17 copies the d+1 low-order bits of the word Wordp101 into the d+1 high-order bits of the word Wordc011, and copies the value of the low-order bit which indicates the current state, here 1, into the low-order bit of the word Wordc011.

With reference to FIG. 11 for the state {1,0,0} of the current event, the calculations of $Sequ_k(100)$ in steps 106 and 107 are replaced by the following calculations. A word of d+2 bits, dubbed for example Wordc100, is intended to contain the series $Sequ_k(100)$.

In step 106, the correction circuit 17 copies the d+1 low-order bits of the word Wordp010 into the d+1 high-order bits of the word Wordc100, and copies the value of the low-order bit which indicates the current state, here 0, into the low-order bit of the word Wordc100.

In step 107, the correction circuit 17 copies the d+1 low-order bits of the word Wordp110 into the d+1 high-order bits of the word Wordc100, and copies the value of the low-order bit which indicates the current state, here 0, into the low-order bit of the word Wordc100.

With reference to FIG. 12 for the state {1,0,1} of the current event, the calculations of $Sequ_k(101)$ in steps 116 and 117 are replaced by the following calculations. A word of d+2 bits, dubbed for example Wordc101, is intended to contain the series $Sequ_k(101)$.

In step 116, the correction circuit 17 copies the d+1 low-order bits of the word Wordp011 into the d+1 high order bits of the word Wordc101, and copies the value of the low-order bit which indicates the current state, here 1, into the low-order bit of the word Wordc100.

In step 117, the correction circuit 17 copies the d+1 low-order bits of the word Wordp110 into the d+1 high-order bits of the word Wordc101, and copies the value of the low-order bit which indicates the current state, here 1, into the low-order bit of the word Wordc101.

With reference to FIG. 13 for the state {1,1,0} of the current event, the calculations of $Sequ_k(110)$ in steps 126 and 127 are replaced by the following calculations. A word of d+2 bits, dubbed for example Wordc110, is intended to contain the series $Sequ_k(110)$.

In step 126, the correction circuit 17 copies the d+1 low-order bits of the word Wordp011 into the d+1 high-order bits of the word Wordc110, and copies the value of the low-order bit which indicates the current state, here 0, into the low-order bit of the word Wordc110.

In step 127, the correction circuit 17 copies the d+1 low-order bits of the word Wordp111 into the d+1 high-order bits of the word Wordc110, and copies the value of the low-order bit which indicates the current state, here 0, into the low-order bit of the word Wordc110.

With reference to FIG. 14 for the state {1,1,1} of the current event, the calculations of $Sequ_k(111)$ in steps 136 and 137 are replaced by the following calculations. A word of d+2 bits, dubbed for example Wordc111, is intended to contain the series $Sequ_k(111)$.

In step 136, the correction circuit 17 copies the d+1 low-order bits of the word Wordp011 into the d+1 high-order bits of the word Wordc111, and copies the value of the low-order bit which indicates the current state, here 1, into the low-order bit of the word Wordc111.

In step 137, the correction circuit 17 copies the d+1 low-order bits of the word Wordp111 into the d+1 high-order bits of the word Wordc111, and copies the value of the low-order bit which indicates the current state, here 1, into the low-order bit of the word Wordc111.

In step 38 with reference to FIG. 6, the correction circuit 17 then reads the three high-order bits of a word Wordpxyz according to a selection criteria as explained previously or of any word Wordpxyz where x, y and z equal 1 or 0, if d is of large enough value for the three high-order bits for all the words Wordpxyz to give the same value.

In step 38, the phase error $d\phi_{k-d}$ received for the event of index k−d is obtained in the next to last cell at the output of the first shift register. The lengths $l_{k-d}$ and $l_{k-d+1}$ for the event of index k−d are obtained in the next to last cell and the last cell of the second shift register. Depending on the state {0,0,0}, {0,0,1}, {0,1,0}, {0,1,1}, {1,0,0}, {1,0,1}, {1,1,0} or {1,1,1}, given by the three high-order bits of the word Wordpxyz, two lengths $N_{k-d}$ and $N_{k-d+1}$ are estimated from the lengths $l_{k-d}$ and $l_{k-d+1}$. A random phase error $d\phi a(d\phi_{k-d}, N_{k-d}, N_{k-d+1})$ is calculated in an identical manner to the random phase error $d\phi a(d\phi_k, l_k, l_{k+1})$ for the same state in step 37.

The estimated length $N_{k-d}$ is output from the correction circuit 17 to be utilized by the system. The random phase error $d\phi a(d\phi_{k-d}, N_{k-d}, N_{k-d+1})$ is transmitted to the phase-locked circuit 16 to be deducted from the current phase error to reduce a phase drift over a sequence of d symbols. Advantageously, the random phase error $d\phi a(d\phi_{k-d}, N_{k-d}, N_{k-d+1})$ is subtracted from the eight path distances $Path_k$(xxx) to avoid risks of overflow of a value for a large quantity of symbols.

In step 39 which follows step 38, the incrementation of k is not necessary since it is implicit if the character k indicates the current event. The string of characters k−1 indicates the preceding event and the string of characters k+1 indicates the following event. It is sufficient to reupdate the content of each word relating to the event of index k−1 with the content of the corresponding word relating to the event of index k. Thus in step 39, the incrementation of k is replaced with the following word copies:

Wordp000:=Wordc000;
Wordp001:=Wordc001;
Wordp010:=Wordc010;
Wordp011:=Wordc011;
Wordp100:=Wordc100;
Wordp101:=Wordc101;
Wordp110:=Wordc110;
Wordp111:=Wordc111;
$Path_{k-1}(000):=Path_k(000)$;
$Path_{k-1}(001):=Path_k(001)$;
$Path_{k-1}(010):=Path_k(010)$;
$Path_{k-1}(011):=Path_k(011)$;
$Path_{k-1}(100):=Path_k(100)$;
$Path_{k-1}(101):=Path_k(101)$;
$Path_{k-1}(110):=Path_k(110)$;
$Path_{k-1}(111):=Path_k(111)$;

A second variation of the process, implemented with or without the first variation, allows a considerable reduction in the probability of estimating a symbol length outside a predetermined interval. For example, when the only allowable symbol lengths can take values from 3 to 11, the estimated lengths for each possible state are tested as explained now with reference to FIGS. 7 to 14.

With reference to FIG. 7 for the state {0,0,0}, step 62 is activated only by a confirmation of a transition 60. The transition 60 is confirmed when the estimated length $l_k$ for the state {0,0,0} of the current event is strictly between 2 and 12. If the transition 60 is not confirmed, a transition 61 is confirmed by the complement of the test condition, that is, by the fact that the estimated length $l_k$ for the state {0,0,0} of the current event is not strictly between 2 and 12.

The transition 61 then activates a step 63 which deliberately over estimates the two distances Trans and Trans' to increase the path distance $Path_k$(000), calculated in step 66 or 67. This tends to eliminate the paths passing through the state {0,0,0} of the current event in the detection of the shortest paths for the following events. In step 63, a clock period T with, for example T=2π, is added to the distances Trans and Trans' such as they would have been calculated in step 62.

With reference to FIG. 8 for the state {0,0,1}, step 72 is activated only by a confirmation of a transition 70. The transition 70 is confirmed when the estimated length $l_k$ for the state {0,0,1} of the current event is strictly between 2 and 12. If the transition 70 is not confirmed, a transition 71 is confirmed by the complement of the test condition, that is, by the fact that the estimated length $l_k$ for the state {0,0,1} of the current event is not strictly between 2 and 12.

The transition 71 then activates a step 73 which deliberately over estimates the two distances Trans and Trans' to increase the path distance $Path_k$(001), calculated in step 76 or 77. This tends to eliminate the paths passing through the state {0,0,1} of the current event in the detections of the shortest paths for the following events. In step 73, a clock period T with, for example T=2π, is added to the distances Trans and Trans' such as they would have been calculated in step 72.

With reference to FIG. 9 for the state {0,1,0}, step 82 is activated only by a confirmation of a transition 80. The transition 80 is confirmed when the estimated length $l_k+s_k$ for the state {0,1,0} of the current event is strictly between 2 and 12. If the transition 80 is not confirmed, a transition 81 is confirmed by the complement of the test condition, that is, by the fact that the estimated length $l_k+s_k$ for the state {0,1,0} of the current event is not strictly between 2 and 12.

The transition 81 then activates a step 83 which deliberately over estimates the two distances Trans and Trans' to increase the path distance $Path_k$(010), calculated in step 86 or 87. This tends to eliminate the paths passing through the state {0,1,0} of the current event in the detections of the shortest paths for the following events. In step 83, a clock period T with, for example T=2π, is added to the distances Trans and Trans' such as they would have been calculated in step 82.

With reference to FIG. 10 for the state {0,1,1}, step 92 is activated only by a confirmation of a transition 90. The transition 90 is confirmed when the estimated length $l_k+s_k$ for the state {0,1,1} of the current event is strictly between 2 and 12. If the transition 90 is not confirmed, a transition 91 is confirmed by the complement of the test condition, that is, by the fact that the estimated length $l_k+s_k$ for the state {0,1,1} of the current event is not strictly between 2 and 12.

The transition 91 then activates a step 93 which deliberately over estimates the two distances Trans and Trans' to increase the path distance $Path_k$(011), calculated in step 96 or 97. This tends to eliminate the paths passing through the state {0,1,1} of the current event in the future detections of the shortest paths for the following events. In step 93, a clock period T with, for example T=2π, is added to the distances Trans and Trans' such as they would have been calculated in step 92.

With reference to FIG. 11 for the state {1,0,0}, step 102 is activated only by a confirmation of a transition 100. The transition 100 is confirmed when the estimated length $l_k-s_{k-1}$ for the state {1,0,0} of the current event is strictly between 2 and 12. If the transition 100 is not confirmed, a transition 101 is confirmed by the complement of the test condition, that is, by the fact that the estimated length $l_k-s_{k-1}$ for the state {1,0,0} of the current event is not strictly between 2 and 12.

The transition 101 then activates a step 103 which deliberately over estimates the two distances Trans and Trans' to increase the path distance $Path_k(100)$, calculated in step 106 or 107. This tends to eliminate the paths passing through the state {1,0,0} of the current event in the future detections of the shortest paths for the following events. In step 103, a clock period T with, for example T=2π, is added to the distances Trans and Trans' such as they would have been calculated in step 102.

With reference to FIG. 12 for the state {1,0,1}, step 112 is activated only by a confirmation of a transition 110. The transition 110 is confirmed when the estimated length $l_k-s_{k-1}$ for the state {1,0,1} of the current event is strictly between 2 and 12. If the transition 110 is not confirmed, a transition 111 is confirmed by the complement of the test condition, that is, by the fact that the estimated length $l_k-s_{k-1}$ for the state {1,0,1} of the current event is not strictly between 2 and 12.

The transition 111 then activates a step 113 which deliberately over estimates the two distances Trans and Trans' to increase the path distance $Path_k(101)$, calculated in step 116 or 117. This tends to eliminate the paths passing through the state {1,0,1} of the current event in the future detections of the shortest paths for the following events. In step 113, a clock period T with, for example T=2π, is added to the distances Trans and Trans' such as they would have been calculated in step 112.

With reference to FIG. 13 for the state {1,1,0}, step 122 is activated only by a confirmation of a transition 120. The transition 120 is confirmed when the estimated length $l_k+s_k-s_{k-1}$ for the state {1,1,0} of the current event is strictly between 2 and 12. If the transition 120 is not confirmed, a transition 121 is confirmed by the complement of the test condition, that is, by the fact that the estimated length $l_k+s_k-s_{k-1}$ for the state {1,1,0} of the current event is not strictly between 2 and 12.

The transition 121 then activates a step 123 which deliberately over estimates the two distances Trans and Trans' to increase the path distance $Path_k(110)$, calculated in step 126 or 127. This tends to eliminate the paths passing through the state {1,1,0} of the current event in the future detections of shortest paths for the following events. In step 123, a clock period T with, for example T=2π, is added to the distances Trans and Trans' such as they would have been calculated in step 122.

With reference to FIG. 14 for the state {1,1,1}, step 132 is activated only by a confirmation of a transition 130. The transition 130 is confirmed when the estimated length $l_k+s_k-s_{k-1}$ for the state {1,1,1} of the current event is strictly between 2 and 12. If the transition 130 is not confirmed, a transition 131 is confirmed by the complement of the test condition, that is, by the fact that the estimated length $l_k+s_k-s_{k-1}$ for the state {1,1,1} of the current event is not strictly between 2 and 12.

The transition 131 then activates a step 133 which deliberately over estimates the two distances Trans and Trans' to increase the path distance $Path_k(111)$, calculated in step 136 or 137. This tends to eliminate the paths passing through the state {1,1,1} of the current event in the future detections of shortest paths for the following events.

In step 133, a clock period T with, for example T=2π, is added to the distances Trans and Trans' such as they would have been calculated in step 132.

Figure 15:
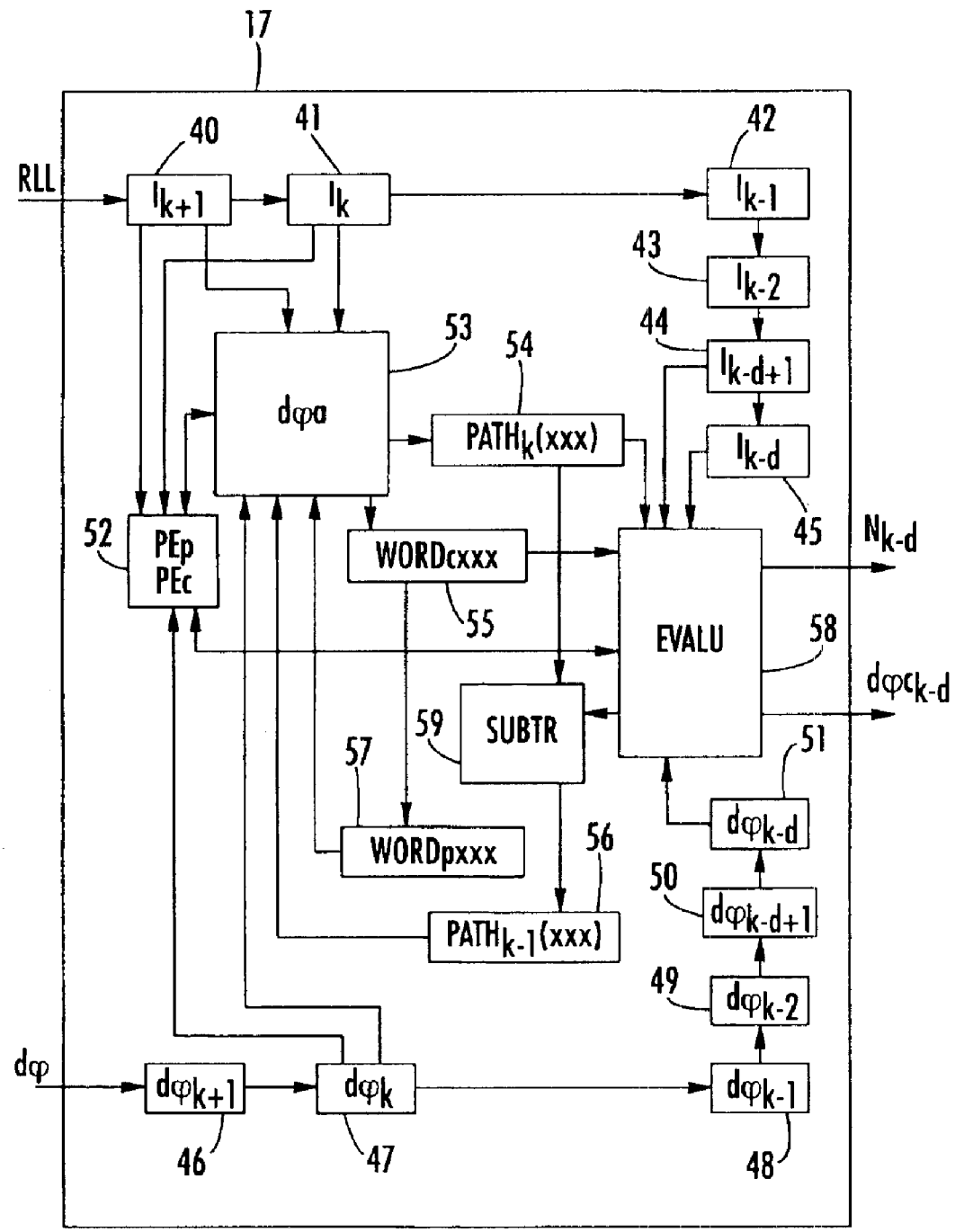
FIG. 15 shows a correction circuit in accordance with the present invention.

With reference to FIG. 15, there is now described the correction circuit 17 which, in its optimum version, forms a Viterbi detector making it possible to estimate symbol lengths over sequences of several symbols to improve the quality of estimation.

Two memory cells 41, 47 are provided with each containing respectively the symbol length $l_k$ and the phase error $d\phi_k$ of the current processed event for which a first symbol is received. Two memory cells 40, 46 are provided with each containing respectively the symbol length $l_{k+1}$ and the phase error $d\phi_{k+1}$ of the following event. The symbol length $l_{k+1}$ is regarded as a second-symbol length for the current event. A first subcircuit 52 is provided for containing a systematic phase error PEp at the end of the first symbol received, and a systematic phase error PEc at the start of the second symbol received for each possible symbol length. A second subcircuit 53 is provided for calculating at least one random phase error dφa at the end of a first symbol followed by a second symbol.

With each receipt of a symbol length RLL and of a phase error dφ at the input of the correction circuit 17, the values received are stored respectively in the cell 40 and in the cell 46, displacing the content of the cells 40 and 46 into the cells 41 and 47 respectively, as represented in FIG. 15 by solid-head arrows.

The subcircuit 53 is designed for executing step 23 or step 37 depending on the process implemented with respect to which it is provided. Micro-software or a combination circuit of the subcircuit 53 is designed for reading the content of the cells 40, 41, 42 and the corresponding content of the subcircuit 52 for calculating each random phase error, as represented in FIG. 15 by open-head arrows.

By convention in FIG. 15, the solid-head arrows represent transfers from a memory area to the memory area with each input-reception of the circuit 17. The open-head arrows represent transfers from a memory area to a subcircuit or from a subcircuit to a memory area between two successive input-receptions of the circuit 17.

The subcircuit 52 comprises in memory a table, each row of which, indexed by a symbol length in a range which encompasses a predetermined interval of allowable symbol lengths, contains a systematic phase error at the end of a first symbol of a corresponding length and a systematic phase error at the start of a second symbol of a corresponding length. Advantageously, the subcircuit 52 is furnished with means of calculation for adjusting the systematic phase errors in real time on the basis of the content of the cells 40, 41 and 47 as is represented in FIG. 15 by the open-head arrows which point to the subcircuit 52, so as to execute a step of the process, such as step 22.

The subcircuit 53 generates two groups of q values, each placed respectively in q memory words 54 and in q memory words 55. Each value placed in a memory word 54 is dependent on a value of random phase error calculated by the subcircuit 53. To each memory word 54 there corresponds a memory word 55 in which is placed a value dependent on a symbol length estimated for the corresponding random phase error value.

For implementation of the process described with reference to FIG. 5, q=2. Two memory words 54 are intended each to contain respectively the absolute value of random phase error |dφa|, |dφ'a|. Two memory words 55 are intended each to contain respectively a first-symbol length and a second-symbol length for each random phase error. The subcircuit 54 is then furnished with arithmetic and logic means for executing step 23. A subcircuit 58 is furnished with arithmetic and logic means for executing steps 26 to 32.

For implementation of the process described with reference to FIGS. 6 to 14, q=8. The subcircuit 53 is then furnished with arithmetic and logic means for executing the transitions and steps 36, 37, 60 to 67, 70 to 77, 80 to 87, 90 to 97, 100 to 107, 110 to 117, 120 to 127, 130 to 137, in such a way as to place the eight possible values $\text{Path}_k(000)$, $\text{Path}_k(001)$ $\text{Path}_k(010)$ $\text{Path}_k(011)$, $\text{Path}_k(100)$, $\text{Path}_k(101)$, $\text{Path}_k(110)$, $\text{Path}_k(111)$, in the eight words 54 and to place the eight possible values $\text{Sequ}_k(000)$, $\text{Sequ}_k(001)$, $\text{Sequ}_k(010)$, $\text{Sequ}_k(011)$, $\text{Sequ}_k(100)$ $\text{Sequ}_k(101)$ $\text{Sequ}_k(110)$, $\text{Sequ}_k(111)$ in the eight words 55. Preferably, each word 55 comprises d+2 bits such that the three low-order bits give the state of the current event, and the three high-order bits give the state of the event d receptions earlier.

For implementation of the process described with reference to FIGS. 6 to 14, the correction circuit 17 comprises d cells 42, 43, 44, 45 and d cells 48, 49, 50, 51, d=4 in the example of FIG. 15 but d may be smaller or larger, for example, d=6 for words 55 of eight bits or d=14 for words 55 of 16 bits. The cells 40 to 45 form a shift register of d+2 cells for stacking the symbol lengths received successively. Cells 46 to 51 form a shift register of d+2 cells for stacking the phase errors received successively.

The subcircuit 58 is furnished with arithmetic and logic means for executing step 38. In particular, the subcircuit 58 receives the content of at least one word 55 so as to retain the three high-order bits thereof which represent the most probable state of the event preceding of d receptions, which is the reception of a symbol length for the current event. Receiving the content of the cell 45 and of the cell 51, the subcircuit is furnished with a simple combination circuit for determining the sign $s_{k-d}$, saving the sign $s_{k-d-1}$ and for generating an estimated symbol length $N_{k-d}$ output from the correction circuit 17, such that:

$N_{k-d} = l_{k-d} + s_{k-d} - s_{k-d-1}$ for a state $\{1,1,x\}$ $N_{k-d} = l_{k-d} - s_{k-d-1}$ for a state $\{1,0,x\}$ $N_{k-d} = l_{k-d} + s_{k-d}$ for a state $\{0,1,x\}$ $N_{k-d} = l_{k-d}$ for a state $\{0,0,x\}$.

Moreover, receiving the content of the cells 44, 45 and of the cell 51, an access to the subcircuit 52 allows the subcircuit 58 to calculate a random phase error $d\phi_{ck-d}$ using the formula of step 37 which is suitable for the state recognized on the three high-order bits of the word 55 retained. The random phase error $d\phi c_{k-d}$ calculated is output from the correction circuit 17.

With each reception by the correction circuit 17, the content of each word 55 is transferred to a corresponding word 57 and the content of each word 54 is transferred to a corresponding word 56. Thus, a reading of the eight words 57 allows the subcircuit 53 to ascertain each of the series $\text{Sequ}_{k-1}(xxx)$, and a reading of the eight words 56 allows the subcircuit 53 to ascertain each of the distances $\text{Path}_{k-1}(xxx)$ of the preceding event, so as to execute steps 66, 67, 76, 77, 86, 87, 96, 97, 106, 107, 116, 117, 126, 127, 136, 137.

Advantageously, the random phase error $d\phi c_{k-d}$ is also sent to a subtractor subcircuit 59 so as to deduct therefrom the absolute value of each word 54 before transfer to the word 56. If the evaluation subcircuit 58 has to perform a test on a shorter distance $\text{Path}_k(xxx)$ in an execution of step 38, it also receives the content of the words 54. For a sufficiently large value of d, this is not necessary since there exists a probability of almost one that the three high-order bits are the same in each of the words 55.

That which is claimed is:

1. A process for evaluating a symbol length based upon receiving a first-symbol length, and upon receiving a phase error with respect to detection of a length of the first symbol before receiving a length of a second symbol which follows the first symbol, the process comprising:
  evaluating a plurality of random phase errors based upon the received phase error, the random phase errors comprising
    a first random phase error being dependent on a first deterministic phase error with respect to a first state corresponding to an absence of a corrected first-symbol length, and
    a second random phase error being dependent on a second deterministic phase error with respect to a second state corresponding to the corrected first-symbol length; and
  retaining as an evaluated symbol length the first-symbol length received if an absolute value of the first random phase error reduces a condition of passing through the first state, and retaining as an evaluated symbol length the corrected first-symbol length if an absolute value of the second random phase error reduces a condition of passing through the second state.

2. A process according to claim 1, wherein the first deterministic phase error is equal to a difference between a systematic phase error at an end of the first symbol, and a systematic phase error at a start of the second symbol having uncorrected lengths; and wherein the second deterministic phase error is equal to a difference between the systematic phase error at the end of the first symbol, and a systematic phase error at the start of the second symbol having corrected lengths.

3. A process according to claim 2, wherein the corrected first and second symbol lengths are based upon respectively increasing and decreasing a clock phase associated therewith.

4. A process according to claim 1, wherein evaluating the random phase errors comprises evaluating eight random phase errors for a current event, four of which are dependent on a deterministic phase error for each of four first states corresponding to an absence of the corrected first-symbol length, and four of which are dependent on a deterministic phase error for each of four second states corresponding to the corrected first-symbol length; and wherein the retained symbol length for a preceding event corresponds to a state of the preceding event for which an aggregate of absolute values of random phase errors for each event state going from the preceding event to the current event is reduced.

5. A process according to claim 4, wherein the aggregate of absolute values of the random phase errors is increased for each event state corresponding to a first-symbol length outside an interval of allowable lengths.

6. A process according to claim 1, further comprising using the random phase error associated with the retained symbol length for adjusting a clock phase used to detect the first-symbol length.

7. A process according to claim 1, wherein the evaluating and retaining are performed in a Viterbi decoder.

8. A process for processing information on a pre-recorded medium, the process comprising:
  reading information from the pre-recorded medium and generating a signal based upon the read information;
  generating a first-symbol length based upon the generated signal, and generating a phase error with respect to detection of a length of the first symbol before generating a length of a second symbol which follows the first symbol;

evaluating a plurality of random phase errors based upon the received phase error, the random phase errors comprising
- a first random phase error being dependent on a first deterministic phase error with respect to a first state corresponding to an absence of a corrected first-symbol length, and
- a second random phase error being dependent on a second deterministic phase error with respect to a second state corresponding to the corrected first-symbol length; and retaining as an evaluated symbol length the first-symbol length received if an absolute value of the first random phase error reduces a condition of passing through the first state, and retaining as an evaluated symbol length the corrected first-symbol length if an absolute value of the second random phase error reduces a condition of passing through the second state.

9. A process according to claim 8, wherein the first deterministic phase error is equal to a difference between a systematic phase error at an end of the first symbol, and a systematic phase error at a start of the second symbol having uncorrected lengths; and wherein the second deterministic phase error is equal to a difference between the systematic phase error at the end of the first symbol, and a systematic phase error at the start of the second symbol having corrected lengths.

10. A process according to claim 9, wherein the corrected first and second symbol lengths are based upon respectively increasing and decreasing a clock phase associated therewith.

11. A process according to claim 9, wherein evaluating the random phase errors comprises evaluating eight random phase errors for a current event, four of which are dependent on a deterministic phase error for each of four first states corresponding to an absence of the corrected first-symbol length, and four of which are dependent on a deterministic phase error for each of four second states corresponding to the corrected first-symbol length; and wherein the retained symbol length for a preceding event corresponds to a state of the preceding event for which an aggregate of absolute values of random phase errors for each event state going from the preceding event to the current event is reduced.

12. A process according to claim 11, wherein the aggregate of absolute values of the random phase errors is increased for each event state corresponding to a first-symbol length outside an interval of allowable lengths.

13. A process according to claim 9, further comprising using the random phase error associated with the retained symbol length for adjusting a clock phase used to detect the first-symbol length.

14. A process according to claim 9, wherein the pre-recorded medium comprises at least one of a compact disk and a digital video disk.

15. A device for evaluating a symbol length, and comprising:
a correction circuit for receiving a first-symbol length, and for receiving a phase error with respect to detection of a length of the first symbol before receiving a length of a second symbol which follows the first symbol, said correction circuit comprising
a first subcircuit for evaluating a plurality of random phase errors based upon the received phase error, the random phase errors comprising
- a first random phase error that is dependent on a first deterministic phase error with respect to a first state corresponding to an absence of a corrected first-symbol length, and
- a second random phase error that is dependent on a second deterministic phase error with respect to a second state corresponding to a corrected first-symbol length; and a second subcircuit connected to said first subcircuit for retaining as an evaluated symbol length the first-symbol length received if the absolute value of the first random phase error reduces a condition of passing through the first state, and for retaining as an evaluated symbol length the corrected first-symbol length if the absolute value of the second random phase error reduces the condition of passing through the second state.

16. A device according to claim 15, further comprising a third subcircuit containing for each possible symbol length a systematic phase error at an end of the first symbol, and a systematic phase error at a start of the second symbol; and wherein said first subcircuit calculates the first deterministic phase error equal to a difference between a systematic phase error at the end of the first symbol, and a systematic phase error at the start of the second symbol having uncorrected lengths; and calculates a second deterministic phase error equal to a difference between the systematic phase error at the end of the first symbol, and a systematic phase error at the start of the second symbol having corrected lengths.

17. A device according to claim 16, wherein the corrected first and second symbol lengths are based upon respectively increasing and decreasing a clock phase associated therewith.

18. A device according to claim 15, wherein said first subcircuit evaluates eight random phase errors for a current event, four of which are dependent on a deterministic phase error for each of four first states corresponding to an absence of the corrected first-symbol length, and four of which are dependent on a deterministic phase error for each of four second states corresponding to the corrected first-symbol length; and wherein said second subcircuit retains the symbol length for a preceding event corresponding to a state of the preceding event for which an aggregate of absolute values of random phase errors for each event state going from the preceding event to the current event is reduced.

19. A device according to claim 18, wherein said first subcircuit increases the aggregate of absolute values of the random phase errors for each event state corresponding to a first-symbol length outside an interval of allowable lengths.

20. A device according to claim 15, further comprising a phase-locked loop circuit connected to said correction circuit for providing the first-symbol length thereto based upon a clock phase; and wherein said second subcircuit generates a value of a random phase error associated with the symbol length retained for adjusting the clock phase in said phase-locked loop circuit.

21. A device according to claim 15, wherein the correction circuit is part of a Viterbi decoder.

22. A system for reading information on a pre-recorded medium, the system comprising:
a reading head for reading information from the pre-recorded medium and generating a signal based upon the read information;
a phase-locked loop circuit for generating a first-symbol length based upon the generated signal, and for generating a phase error with respect to detection of a length of the first symbol before generating a length of a second symbol which follows the first symbol;

a correction circuit connected to said phase-locked loop circuit for receiving the first-symbol length and for receiving the phase error, said correction circuit comprising
  a first subcircuit for evaluating a plurality of random phase errors based upon the received phase error, the random phase errors comprising
    a first random phase error that is dependent on a first deterministic phase error with respect to a first state corresponding to an absence of a corrected first-symbol length, and
    a second random phase error that is dependent on a second deterministic phase error with respect to a second state corresponding to the corrected first-symbol length; and
  a second subcircuit connected to said first subcircuit for retaining as an evaluated symbol length the first-symbol length received if the absolute value of the first random phase error reduces a condition of passing through the first state, and for retaining as evaluated symbol length the corrected first-symbol length if the absolute value of the second random phase error reduces the condition of passing through the second state.

23. A system according to claim 22, wherein said correction circuit further comprises a third subcircuit containing for each possible symbol length a systematic phase error at an end of the first symbol, and a systematic phase error at a start of the second symbol; and wherein said first subcircuit calculates the first deterministic phase error equal to a difference between a systematic phase error at the end of the first symbol, and a systematic phase error at the start of the second symbol having uncorrected lengths; and calculates a second deterministic phase error equal to a difference between the systematic phase error at the end of the first symbol, and a systematic phase error at the start of the second symbol having corrected lengths.

24. A system according to claim 23, wherein the corrected first and second symbol lengths are based upon respectively increasing and decreasing a clock phase associated therewith.

25. A system according to claim 22, wherein said first subcircuit evaluates eight random phase errors for a current event, four of which are dependent on a deterministic phase error for each of four first states corresponding to an absence of the corrected first-symbol length, and four of which are dependent on a deterministic phase error for each of four second states corresponding to the corrected first-symbol length; and wherein said second subcircuit retains the symbol length for a preceding event corresponding to a state of the preceding event for which an aggregate of absolute values of random phase errors for each event state going from the preceding event to the current event is reduced.

26. A system according to claim 25, wherein said first subcircuit increases the aggregate of absolute values of the random phase errors for each event state corresponding to a first-symbol length outside an interval of allowable lengths.

27. A system according to claim 22, wherein said second subcircuit generates a value of a random phase error associated with the symbol length retained for adjusting a clock phase in said phase-locked loop circuit.

28. A system according to claim 22, wherein the prerecorded medium comprises at least one of a compact disk and a digital video disk.

* * * * *

UNITED STATES PATENT AND TRADEMARK OFFICE
CERTIFICATE OF CORRECTION

PATENT NO. : 6,954,413 B2
DATED : October 11, 2005
INVENTOR(S) : Graffoulière

It is certified that error appears in the above-identified patent and that said Letters Patent is hereby corrected as shown below:

Column 11,
Line 38, delete "PE($1_k$+1 $1_{k+1}$-1)" insert -- PE($l_k$+l, $l_{k+1}$ - 1) --.
Line 58, delete "PE($l_k$+$s_k$,$l_{k+1}$-$s_k$+$s_{k+1}$) The" insert -- PE($l_k$+$s_k$,$l_{k+1}$-$s_k$+$s_{k+1}$). The --.

Column 12,
Line 3, delete "(001)" insert -- (011) --.
Lines 48 and 66, delete "Sequk(000)" insert -- Sequ$_k$(000) --.

Column 29,
Lines 51 and 55, delete "claim 9" insert -- claim 8 --.

Signed and Sealed this

Twenty-fifth Day of April, 2006

JON W. DUDAS
*Director of the United States Patent and Trademark Office*